US012672043B2

(12) United States Patent
Akl et al.

(10) Patent No.: US 12,672,043 B2
(45) Date of Patent: Jun. 30, 2026

(54) DETERMINATION OF L2 RESET IN LOWER LAYER MOBILITY

(71) Applicant: QUALCOMM Incorporated, San Diego, CA (US)

(72) Inventors: Naeem Akl, Bridgewater, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/479,743

(22) Filed: Oct. 2, 2023

(65) Prior Publication Data

US 2024/0155456 A1　May 9, 2024

Related U.S. Application Data

(60) Provisional application No. 63/382,285, filed on Nov. 3, 2022.

(51) Int. Cl.
*H04W 36/32* (2009.01)
*H04W 36/00* (2009.01)
*H04W 36/08* (2009.01)

(52) U.S. Cl.
CPC ..... *H04W 36/324* (2023.05); *H04W 36/0061* (2013.01); *H04W 36/00692* (2023.05); *H04W 36/0072* (2013.01); *H04W 36/008357* (2023.05); *H04W 36/087* (2023.05)

(58) Field of Classification Search
CPC ........... H04W 36/324; H04W 36/0061; H04W 36/00692; H04W 36/0072; H04W 36/008357; H04W 36/087; H04W 36/0055
See application file for complete search history.

(56) References Cited

U.S. PATENT DOCUMENTS

2021/0385708 A1　12/2021　Damnjanovic et al.
2024/0147328 A1*　5/2024　Kim ...................... H04W 36/30

OTHER PUBLICATIONS

International Search Report and Written Opinion—PCT/US2023/034384—ISA/EPO—Jan. 26, 2024.
NEC: "Basic Considerations on Dynamic Switch", 3GPP TSG-RAN WG2 #119bis-e, R2-2210399, 3rd Generation Partnership Project, Mobile Competence Centre, 650, Route Des Lucioles, F-06921 Sophia-Antipolis Cedex, France, vol. RAN WG2, No. Electronic meeting, Oct. 10-Oct. 19, 2022, Sep. 30, 2022, 3 Pages, XP052263719, Chapter 2, Proposal 2, Chapter 2, Section b), p. 2.

* cited by examiner

*Primary Examiner* — Khoa Huynh
(74) *Attorney, Agent, or Firm* — Procopio, Cory, Hargreaves & Savitch LLP

(57) ABSTRACT

A method for wireless communication at a user equipment (UE) is provided. In the method, the UE receives, via radio resource control (RRC), a configuration of multiple candidate cells for layer 1 (L1) or layer 2 (L2) inter-cell mobility from a network entity, and receive information about an L2 reset when switching between the multiple candidate cells from the network entity. Then, the UE performs a serving cell switch within the candidate cells for the UE in response to L1 or L2 signaling, and resets or reuses an L2 cell configuration based on the information in response to the serving cell switch.

29 Claims, 15 Drawing Sheets

CU 402

DU 1 404

Deactivated Cell Set 410

N CCs

Cell7

Cell6

Cell5'

Cell5

Cell4

Cell4'

Cell3'

Cell3

Cell2'

Cell2

Cell1

Activated Cell Set 408

L1/L2 Mobility Configured Cell Set 406

412

400

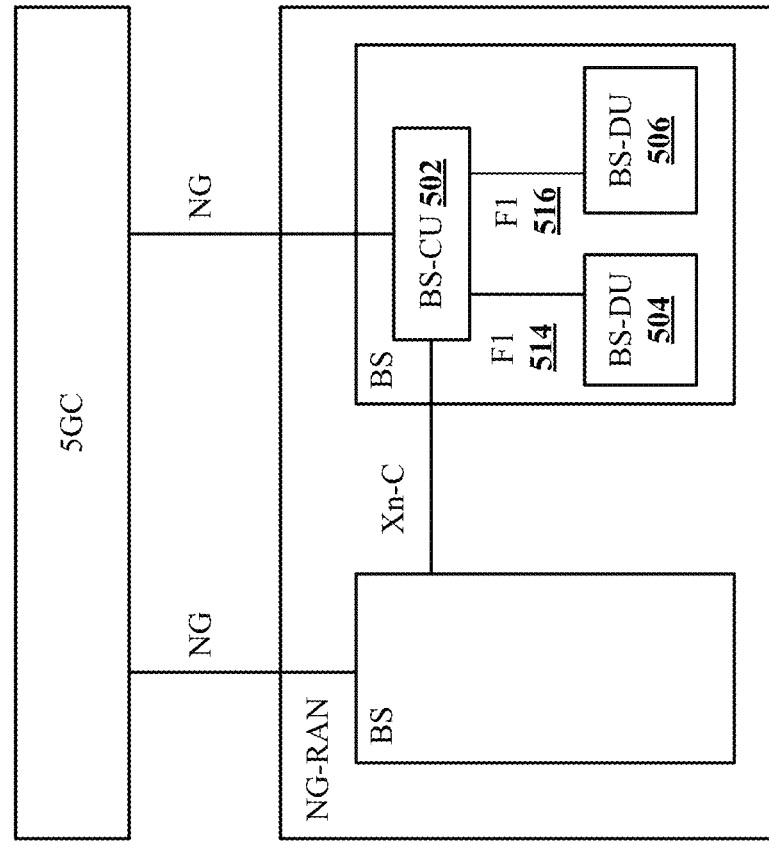
FIG. 5

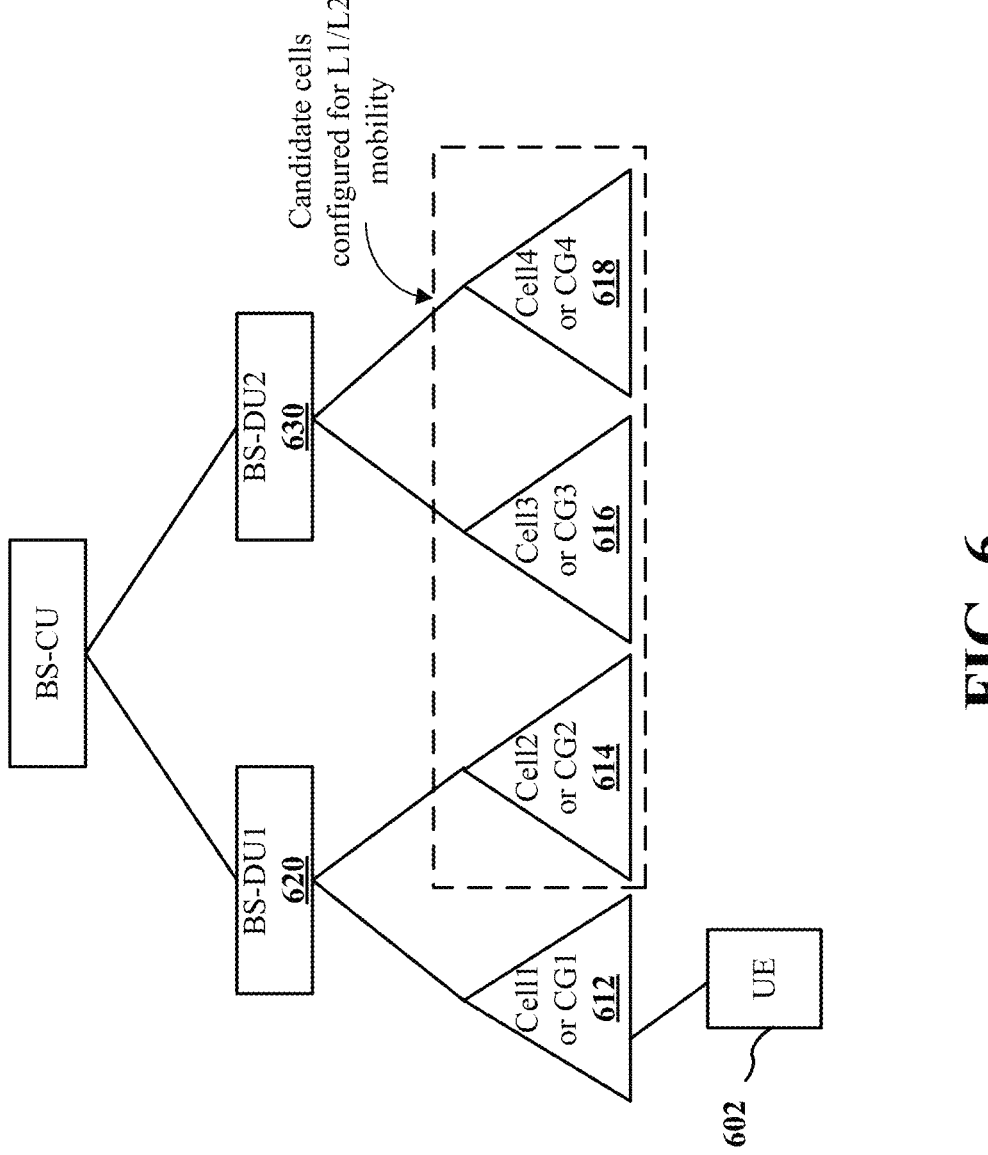
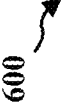
FIG. 6

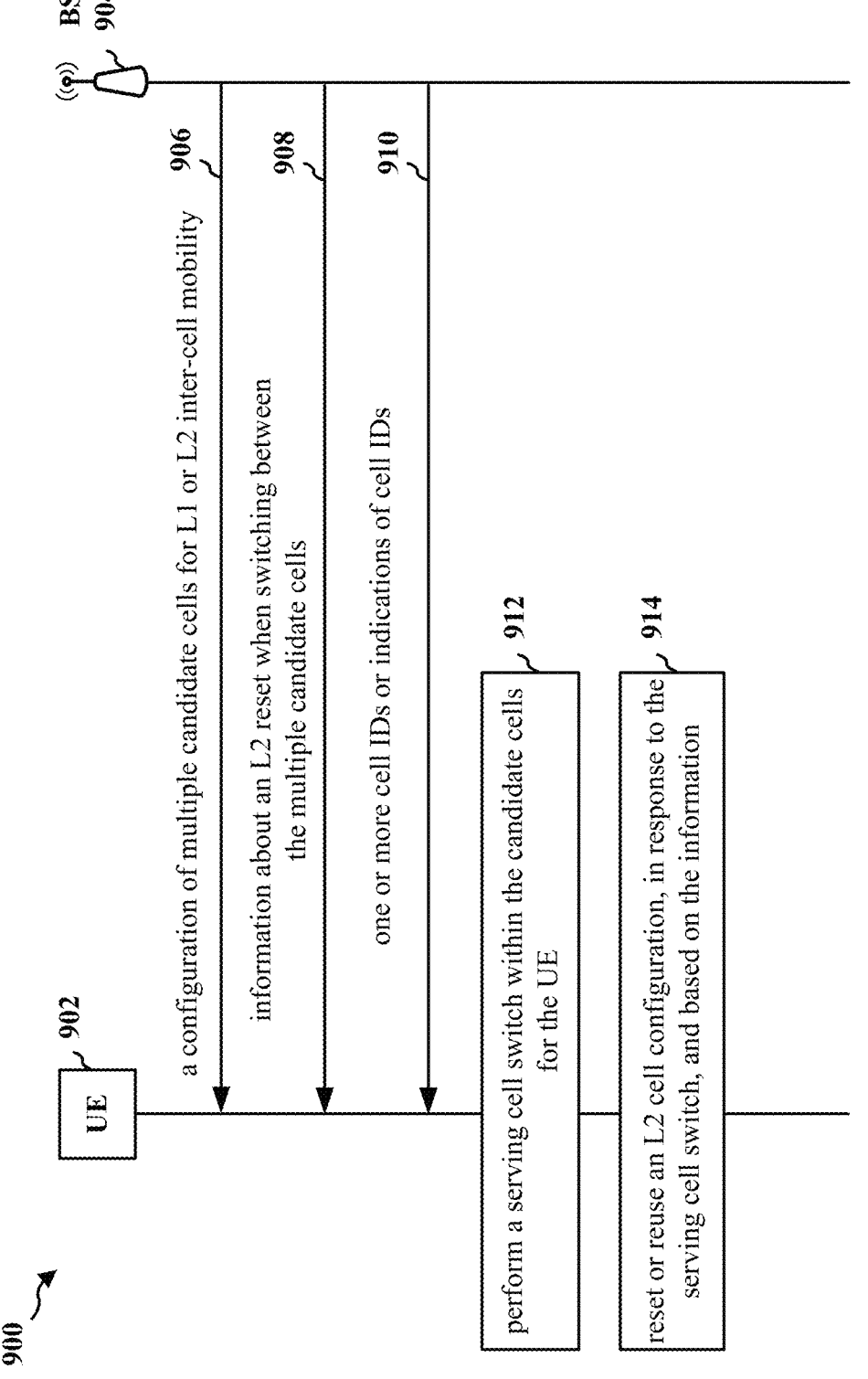

900

UE 902

BS 904 a configuration of multiple candidate cells for L1 or L2 inter-cell mobility 906 information about an L2 reset when switching between the multiple candidate cells 908 one or more cell IDs or indications of cell IDs 910 perform a serving cell switch within the candidate cells for the UE 912 reset or reuse an L2 cell configuration, in response to the serving cell switch, and based on the information 914

FIG. 9

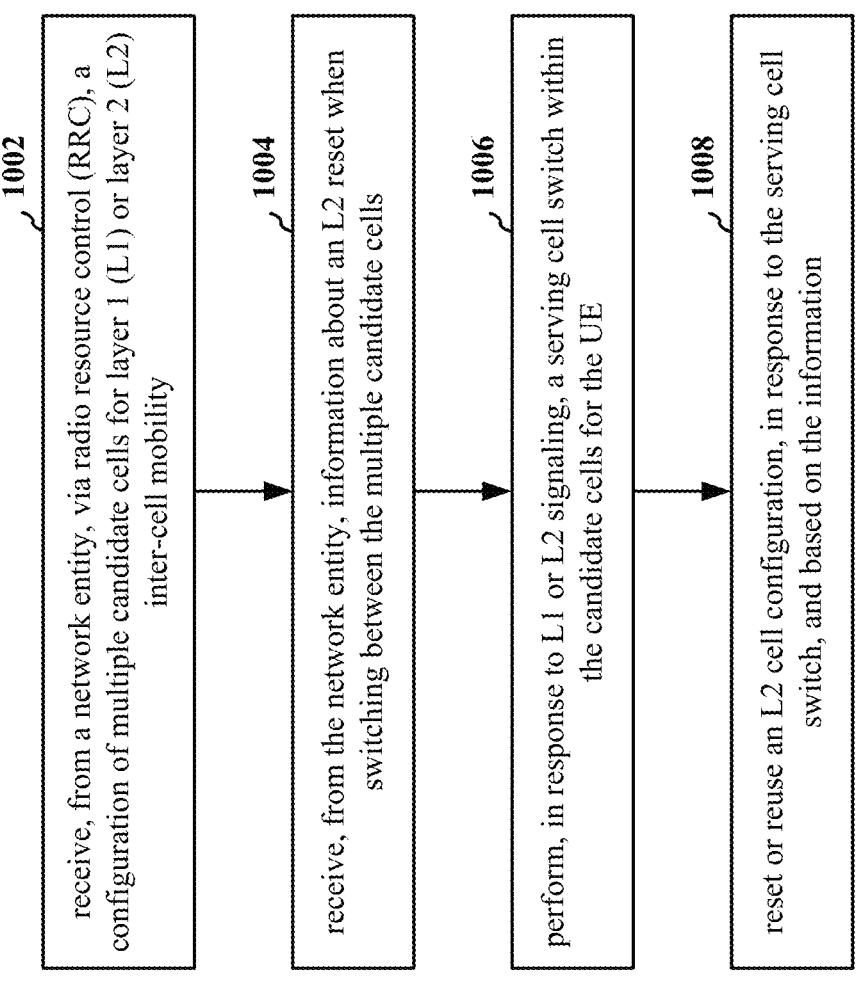

1002 receive, from a network entity, via radio resource control (RRC), a configuration of multiple candidate cells for layer 1 (L1) or layer 2 (L2) inter-cell mobility

1004 receive, from the network entity, information about an L2 reset when switching between the multiple candidate cells

1006 perform, in response to L1 or L2 signaling, a serving cell switch within the candidate cells for the UE

1008 reset or reuse an L2 cell configuration, in response to the serving cell switch, and based on the information

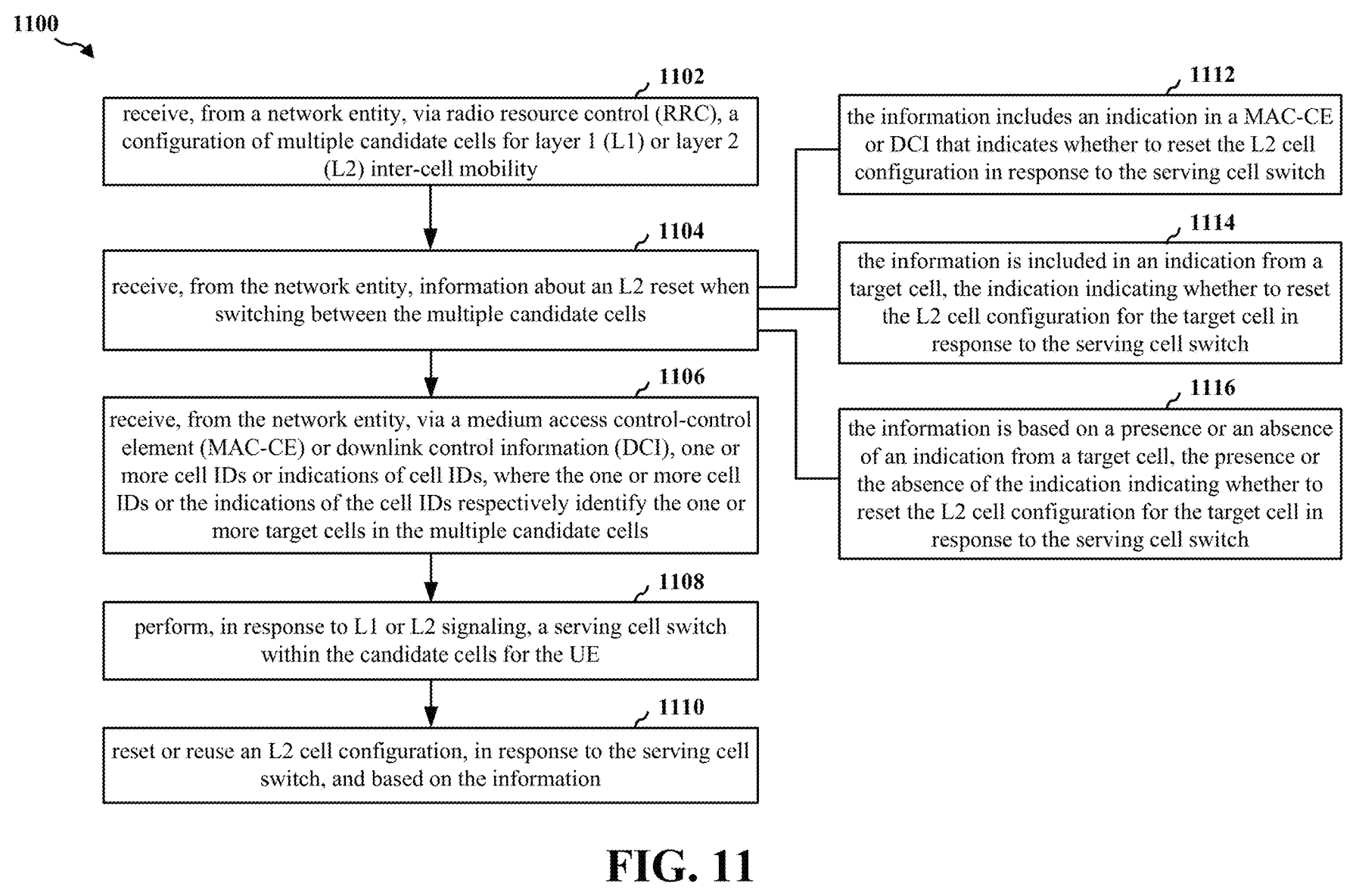

1102 receive, from a network entity, via radio resource control (RRC), a configuration of multiple candidate cells for layer 1 (L1) or layer 2 (L2) inter-cell mobility 1104 receive, from the network entity, information about an L2 reset when switching between the multiple candidate cells 1112 the information includes an indication in a MAC-CE or DCI that indicates whether to reset the L2 cell configuration in response to the serving cell switch 1114 the information is included in an indication from a target cell, the indication indicating whether to reset the L2 cell configuration for the target cell in response to the serving cell switch 1116 the information is based on a presence or an absence of an indication from a target cell, the presence or the absence of the indication indicating whether to reset the L2 cell configuration for the target cell in response to the serving cell switch 1106 receive, from the network entity, via a medium access control-control element (MAC-CE) or downlink control information (DCI), one or more cell IDs or indications of cell IDs, where the one or more cell IDs or the indications of the cell IDs respectively identify the one or more target cells in the multiple candidate cells 1108 perform, in response to L1 or L2 signaling, a serving cell switch within the candidate cells for the UE 1110 reset or reuse an L2 cell configuration, in response to the serving cell switch, and based on the information

FIG. 11

1202 transmit, to a user equipment (UE), via radio resource control (RRC), a configuration of multiple candidate cells for layer 1 (L1) or layer 2 (L2) inter-cell mobility 1204 transmit, to the UE, information about an L2 reset when switching between the multiple candidate cells to cause the UE to perform a cell switch between multiple candidate cells

1200

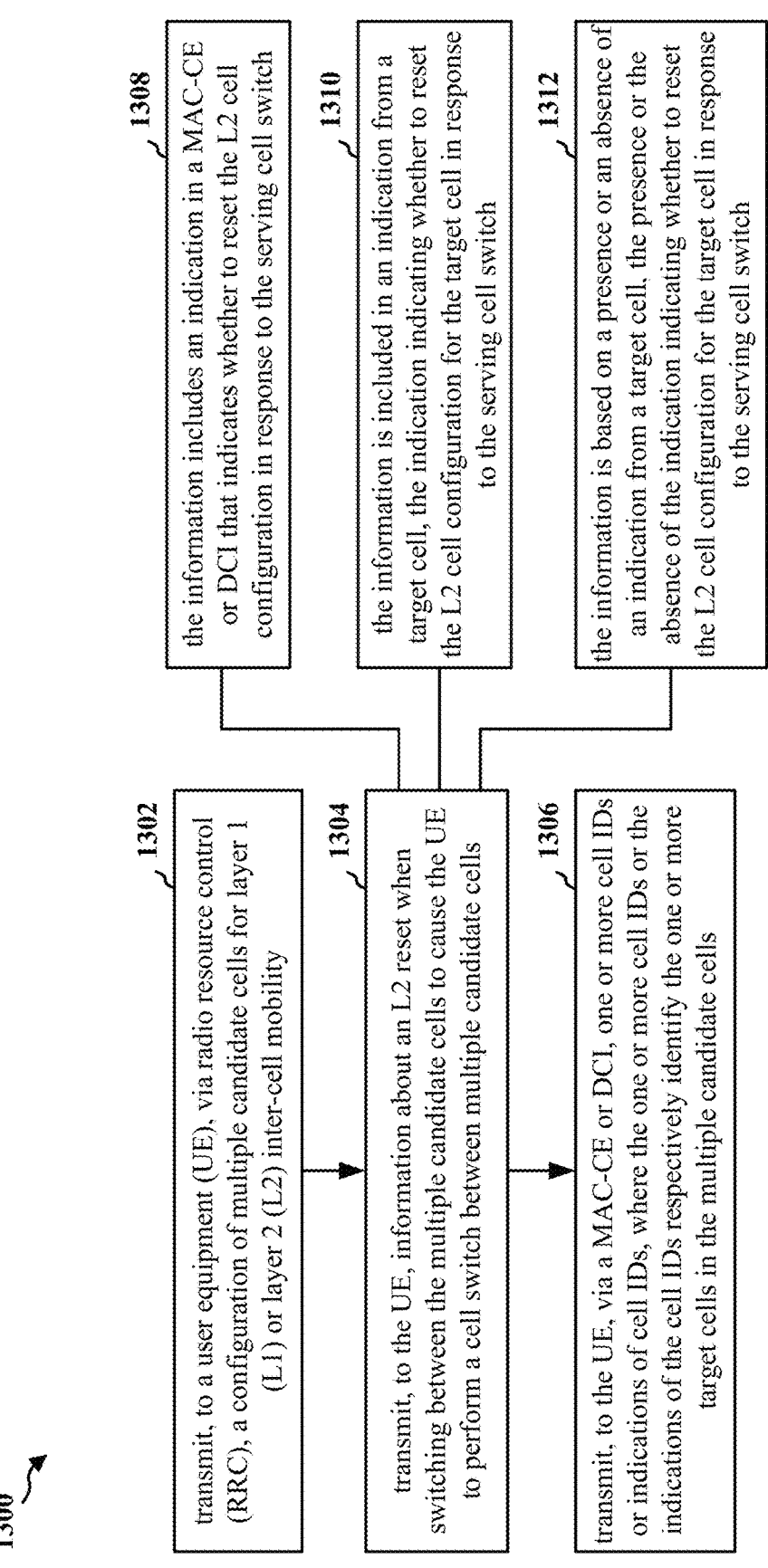

1300

1302 transmit, to a user equipment (UE), via radio resource control (RRC), a configuration of multiple candidate cells for layer 1 (L1) or layer 2 (L2) inter-cell mobility 1304 transmit, to the UE, information about an L2 reset when switching between the multiple candidate cells to cause the UE to perform a cell switch between multiple candidate cells 1306 transmit, to the UE, via a MAC-CE or DCI, one or more cell IDs or indications of cell IDs, where the one or more cell IDs or the indications of the cell IDs respectively identify the one or more target cells in the multiple candidate cells 1308 the information includes an indication in a MAC-CE or DCI that indicates whether to reset the L2 cell configuration in response to the serving cell switch 1310 the information is included in an indication from a target cell, the indication indicating whether to reset the L2 cell configuration for the target cell in response to the serving cell switch 1312 the information is based on a presence or an absence of an indication from a target cell, the presence or the absence of the indication indicating whether to reset the L2 cell configuration for the target cell in response to the serving cell switch

FIG. 13

DETERMINATION OF L2 RESET IN LOWER LAYER MOBILITY

CROSS REFERENCE TO RELATED APPLICATION(S)

This application claims the benefit of and priority to U.S. Provisional Application Ser. No. 63/382,285, entitled "DETERMINATION OF L2 RESET IN LOWER LAYER MOBILITY" and filed on Nov. 3, 2022, which is expressly incorporated by reference herein in its entirety.

TECHNICAL FIELD

The present disclosure relates generally to communication systems, and more particularly, to the determination of layer 2 (L2) reset in lower layer mobility for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to receive, via radio resource control (RRC), a configuration of multiple candidate cells for layer 1 (L1) or L2 inter-cell mobility from a network entity; receive, from the network entity, information about an L2 reset when switching between the multiple candidate cells; perform, in response to L1 or L2 signaling, a serving cell switch within the candidate cells for the UE; and reset or reuse an L2 cell configuration, in response to the serving cell switch and based on the information.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to transmit, via RRC, a configuration of multiple candidate cells for L1 or L2 inter-cell mobility to a UE; and transmit, to the UE, information about an L2 reset when switching between the multiple candidate cells to cause the UE to perform a cell switch between multiple candidate cells. The UE may perform the cell switch by: performing, in response to L1 or L2 signaling, a serving cell switch within the candidate cells for the UE, and resetting or reusing an L2 cell configuration, in response to the serving cell switch, and based on the information.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating the overall architecture of next generation radio access network (NG-RAN).

FIG. 6 is a diagram illustrating an example of lower layer mobility.

FIG. 9 is a call flow diagram illustrating a method of wireless communication in accordance with various aspects of the present disclosure.

FIG. 10 is the first flowchart illustrating methods of wireless communication at a UE in accordance with various aspects of the present disclosure.

FIG. 11 is the first flowchart illustrating methods of wireless communication at a UE in accordance with various aspects of the present disclosure.

FIG. 13 is the first flowchart illustrating methods of wireless communication at a network entity in accordance with various aspects of the present disclosure.

DETAILED DESCRIPTION

Figure 1:
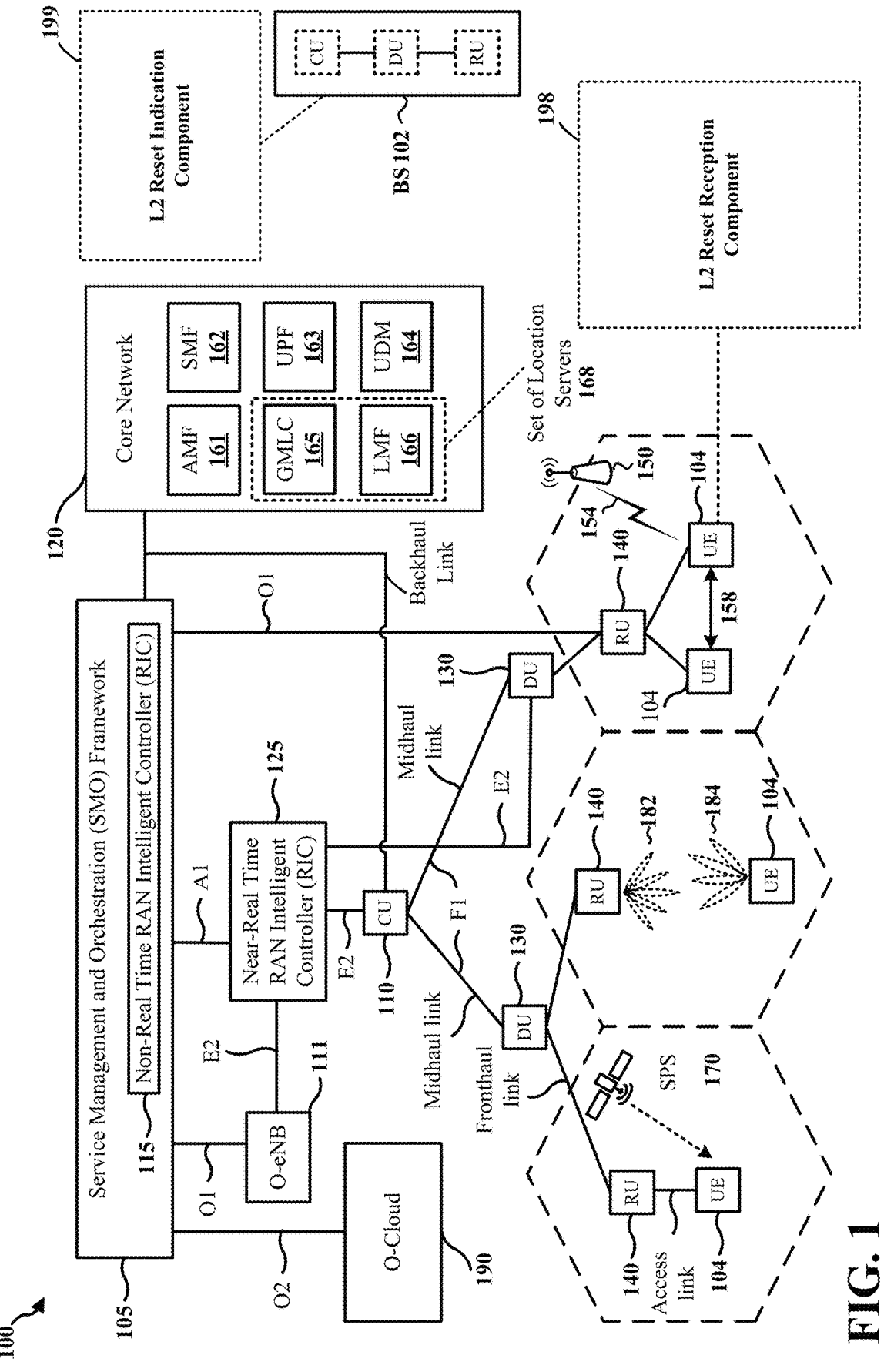
FIG. 1 is a diagram illustrating an example of a wireless communication system and an access network.

A UE may change its serving cells through lower layer (L1/L2) mobility to reduce the communication overhead compared with the serving cell change using a layer 3 (L3) handover. Example aspects presented herein include methods and apparatus for the determination of L2 reset in lower layer mobility for wireless communication. In one aspect, a UE may receive, via RRC, a configuration of multiple candidate cells for L1 or L2 inter-cell mobility (e.g., L1/L2-triggered mobility, or LTM) from a network entity, and receive information about an L2 reset when switching between the multiple candidate cells from the network entity. The UE may further perform, in response to L1 or L2 signaling, a serving cell switch within the candidate cells for the UE, and reset or reuse an L2 cell configuration in response to the serving cell switch and based on the information. The method enables single or successive serving cell switches through lower layer (e.g., L2) inter-cell mobility. Hence, it reduces the communication overhead when switching the serving cell. Additionally, by transmitting information related to the serving cell switch via multiple indications, the security of wireless communication is improved.

Particular aspects of the subject matter described in this disclosure can be implemented to realize one or more of the following potential advantages. In some examples, by enabling single or successive serving cell switches through lower layer (e.g., L2) inter-cell mobility, the described techniques can be used to reduce the communication overhead when switching the serving cell. In some aspects, by transmitting information related to the serving cell switch via multiple indications, the described techniques improve the security of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz).

Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an L2 reset reception component 198. The L2 reset reception component 198 may be configured to receive, via RRC, a configuration of multiple candidate cells for L1 or L2 inter-cell mobility (e.g., L1/L2-triggered mobility, or LTM) from a network entity; receive, from the network entity, information about an L2 reset when switching between the multiple candidate cells; perform, in response to L1 or L2 signaling, a serving cell switch within the candidate cells for the UE; and reset or reuse an L2 cell configuration, in response to the serving cell switch and based on the information. In certain aspects, the base station 102 may include an L2 reset indication component 199. The L2 reset indication component 199 may be configured to transmit, via RRC, a configuration of multiple candidate cells for L1 or L2 inter-cell mobility to a UE; and transmit, to the UE, information about an L2 reset when switching between the multiple candidate cells to cause the UE to perform a cell switch between multiple candidate cells. The UE may perform the cell switch by: performing, in response to L1 or L2 signaling, a serving cell switch within the candidate cells for the UE, and resetting or reusing an L2 cell configuration, in response to the serving cell switch, and based on the information. Although the following description may be focused on 5G NR, the concepts described herein may be applicable to other similar areas, such as LTE, LTE-A, CDMA, GSM, and other wireless technologies.

Figures 2A, 2B, 2C, 2D:
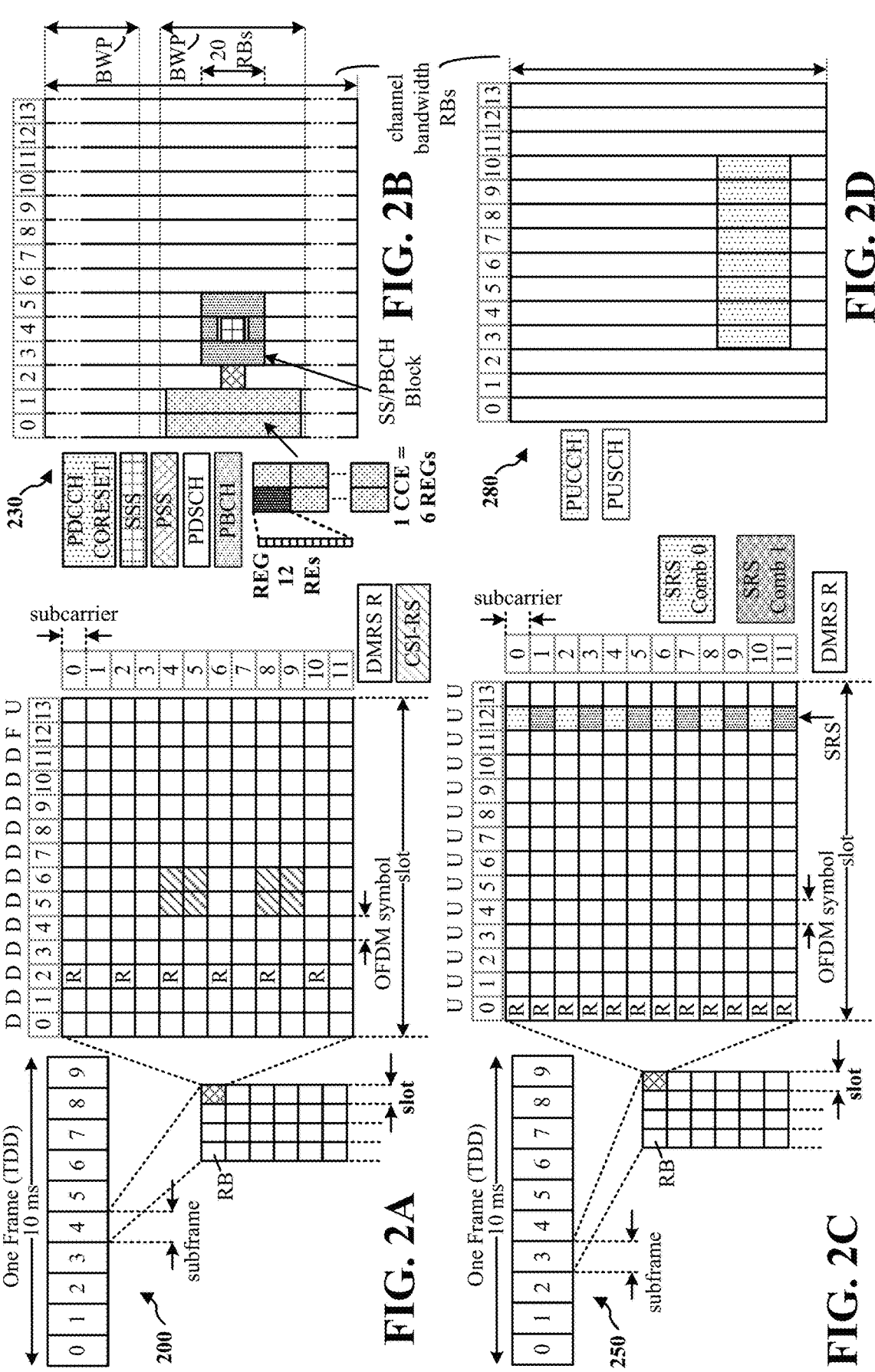
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
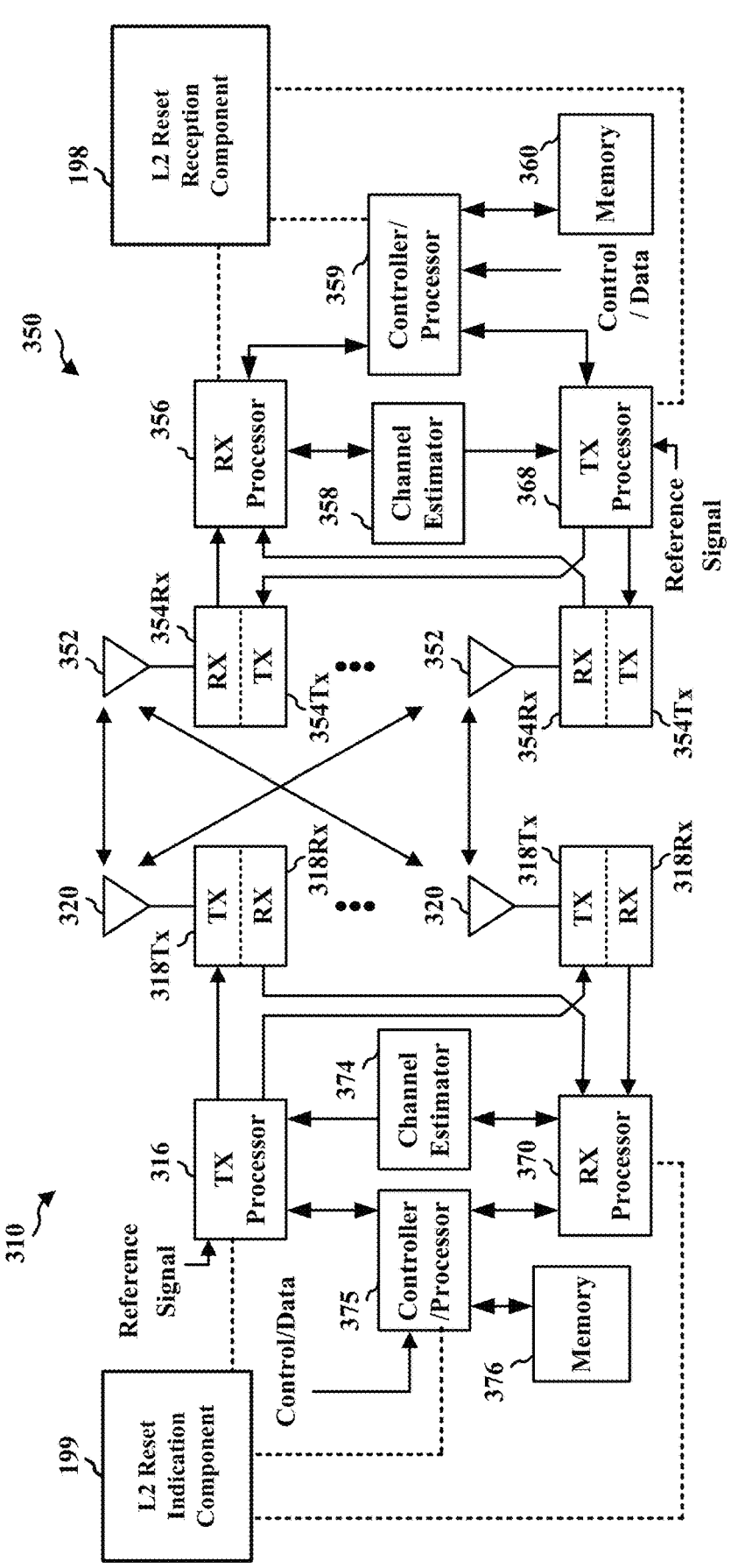
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the L2 reset reception component 198 of FIG. 1.

At least one of the TX processor 316, the RX processor 370, and the controller/processor 375 may be configured to perform aspects in connection with the L2 reset indication component 199 of FIG. 1.

Figure 4:
FIG. 4 is a diagram illustrating an example cell configuration.

FIG. 4 is a diagram 400 illustrating an example cell configuration. As illustrated in FIG. 4, a CU 402 (which may correspond to a component of a base station such as a gNB)

may be associated with a first DU 404 (and other DUs). An L1/L2 mobility configured cell set 406 may be associated with the first DU 404 and may include an L1/L2 mobility activated cell set 408 and an L1/L2 mobility deactivated cell set 410. The L1/L2 mobility configured cell set 406 may also include one or more cells not in the current L1/L2 mobility activated cell set 408 or the current L1/L2 mobility deactivated cell set 410. For example, at a given time, the L1/L2 mobility activated cell set 408 may include a first subset of the L1/L2 mobility configured cell set, and the L1/L2 mobility deactivated cell set 410 may include a second, non-overlapping subset of the L1/L2 mobility configured cell set. There may remain one or more cells that are in the L1/L2 mobility configured cell set that are not in the first set subset (e.g., activated) or the second subset (e.g., deactivated). A UE 412 may use the cells in the L1/L2 mobility activated cell set 508 for data channel and control channel communications.

The UE 412 may be configured with a set of cells or cell groups for L1/L2-triggered mobility (LTM). The UE 412 may receive for each candidate cell or cell group an associated candidate RRC configuration that could be an RRC reconfiguration message or a cellgroupconfig message along other information elements (IEs). A candidate cell for LTM may be a current serving PCell, a current serving SCell, or a current non-serving cell. If the candidate cell for LTM is a current serving SCell, it may be activated or deactivated before executing LTM. Upon executing LTM, the UE 412 may switch to a target cell or target cell group. For the latter case, the UE would have switched to a target PCell and one or more SCells, each of which may be activated or deactivated.

A UE may be provided with a subset of L1/L2 mobility deactivated cells (candidate cell set) that the UE may autonomously choose to add to the L1/L2 mobility activated cell set. For example, the UE may add cells in the subset of L1/L2 mobility deactivated cells to the L1/L2 mobility activated cell set based on measurements (e.g., measured channel quality), loading, or the like. In some aspects, each of the RUs could have multi-component carrier (CC) (N CCs) support (where each CC is a cell). In some aspects, activation or deactivation may be performed for groups of carriers (cells).

A network node (e.g., a base station) may change a cell for a UE using an L3 handover (e.g., using RRC signaling). However, L3 handovers may be time-consuming and/or inefficient. A network node may utilize the improved L1/L2 signaling scheme to change one or more cells for a UE in a more rapid manner in comparison to L3 (RRC) based approaches. For example, a UE may receive an L1 or L2 mobility cell configuration for a set of cells for L1 or L2 inter-cell mobility (e.g., L1/L2-triggered mobility, or LTM). The set of cells may include multiple cells, and each cell in the set of cells can be activated or deactivated for data and/or control transfer using L1 or L2 signaling. The UE may receive L1 or L2 signaling indicating multiple activated cells and activate one or more cells in the multiple activated cells in a priority order for the data and/or control transfer using L1 or L2 signaling.

FIG. 5 is a diagram 500 illustrating the overall architecture of NG-RAN. As shown in FIG. 5, the central unit of a base station (BS-CU), such as BS-CU 502, may correspond to a logical node that hosts RRC, SDAP and PDCP protocols of the base station that control the operation of one or more distributed units of the base station (BS-DUs), such as BS-DU 504, 506, as shown in FIG. 5. The BS-CU 502 may terminate the F1 interface (e.g., F1 interfaces 514, 516)

connected with BS-DU 504, 506. A BS-DU, such as BS-DU 504, 506, may correspond to a logical node that hosts RLC, MAC and PHY layers of the base station. The operation of a BS-DU may be controlled by a BS-CU. One BS-DU may support one or more cells, and one cell may be supported by only one BS-DU. A BS-DU may terminate the F1 interface (e.g., F1 interfaces 514, 516) connected with the BS-CU.

Wireless communication may adopt various mobility scenarios. In some scenarios, a serving cell may be changed through an L3 handover, and the cell evaluation may be relatively slow (on the order of 1 second). An L3 handover may incur about 80 ms blackout time, and no data can go through during this period. In some scenarios, a UE may connect to a serving cell for control and data and potentially connect to additional cells (non-serving cells) for data. Non-serving cells may be changed using L1/L2 signaling with no blackout time. If a serving cell's Reference Signal Received Power (RSRP) is sufficiently large (e.g., greater than a threshold) or a new serving cell is sufficiently close to the old serving cell, no L3 handover is necessary when changing the serving cell. Otherwise, the UE may perform an L3 handover on the best available cell (and incur blackout time). In order to reduce the time and signaling for inter-cell mobility, in some aspects, the serving cell may be changed through L1/L2signaling without involving an L3 handover. Thus, no or reduced blackout time will be incurred when a serving cell is changed. The serving cell change through L1/L2 signaling may be applicable to intra-DU and inter-DU scenarios.

FIG. 6 is a diagram 600 illustrating an example of lower layer (e.g., L1 or L2) inter-cell mobility, or L1/L2-triggered mobility (LTM). As shown in FIG. 6, a UE 602 may be served by a serving cell (Cell 1 612) or by a cell group (e.g., CG1). The UE 602 may be configured with a group of cells as candidate cells for L1/L2 mobility. The groups of cells may include, for example, Cell 2 614, Cell 3 616, and Cell 4 618, as shown in FIG. 6. Although the example is described in connection with individual cells, the aspects are similarly applicable for cells groups, e.g., and the Cell 2 614 may be a cell group 2, the Cell 3 616 may be a cell group 3, and/or the Cell 4 618 may be a cell group 4. The UE 602 may receive RRC configurations associated with Cell 2 614, Cell 3 616, and Cell 4 618. When the serving cell is changed to a target cell selected for switching, the UE 602 may apply the associated RRC configuration of the target cell. The UE 602 may perform measurements (e.g., L1 measurements) on the candidate cells, and the target cell may be selected based on these measurements. For example, the UE 602 may provide a measurement report and receive a cell switch command via L1/L2 signaling (e.g., a medium access control-control element (MAC-CE) or DCI). Thus, a set of candidate cells for L1/L2 inter-cell mobility may be configured for the UE, and a subset of the candidate cells may be activated for the UE. The cells that are not activated, which in some aspects may be referred to as deactivated cells, are cells for which the UE received the L1/L2 mobility configuration, and for which the UE performs measurements but not used for the transfer of data or control until activated. As the UE moves, cells from the L1/L2 mobility configured cell set may be deactivated and activated by L1/L2 signaling based on signal quality (e.g., based on measurements), loading, or the like. Example measurements may include cell coverage measurements represented by RSRP, and quality represented by Radio Signal Received Quality (RSRQ), or other measurements that the UE performs on signals from the base station. In some aspects, the measurements may be L1 measurements such as one or more of an RSRP, an RSRQ, a received signal strength indicator (RSSI), or a signal to noise and interference ratio (SINR) measurement of various signals, such as an SSB, a PSS, an SSS, a broadcast channel (BCH), a DM-RS, CSI-RS, or the like. The mechanisms for lower layer inter-cell mobility (e.g., LTM) are applicable to the scenarios that involve cell groups. For example, the UE 602 may be served by a cell group (e.g., cell group 1 (CG1)) and be configured with a group of candidate cell groups for L1/L2 mobility (e.g., CG2, CG3, CG4). The UE 602 may switch the serving cell (or serving cell group) among the candidate cell groups based on the same principle described above.

The configuration and maintenance of multiple candidate cells may allow for a quicker application of configurations for the candidate cells, and the activated set of cells may provide for dynamic switching among the candidate serving cells (e.g., including an SpCell and SCell) based on L1 or L2 signaling.

When a UE performs an L3 handover, the RRC signaling (e.g., L3 signaling) indicates for the UE to perform an L2 reset, e.g., a MAC reset, RLC reset, or PDCP recovery. In inter-cell mobility, the UE does not receive L3 signaling indicating a handover. Aspects presented herein enable a UE to determine whether or not to perform an L2 reset in response to inter-cell mobility triggered by L1 or L2 signaling.

Figures 7A, 7B:
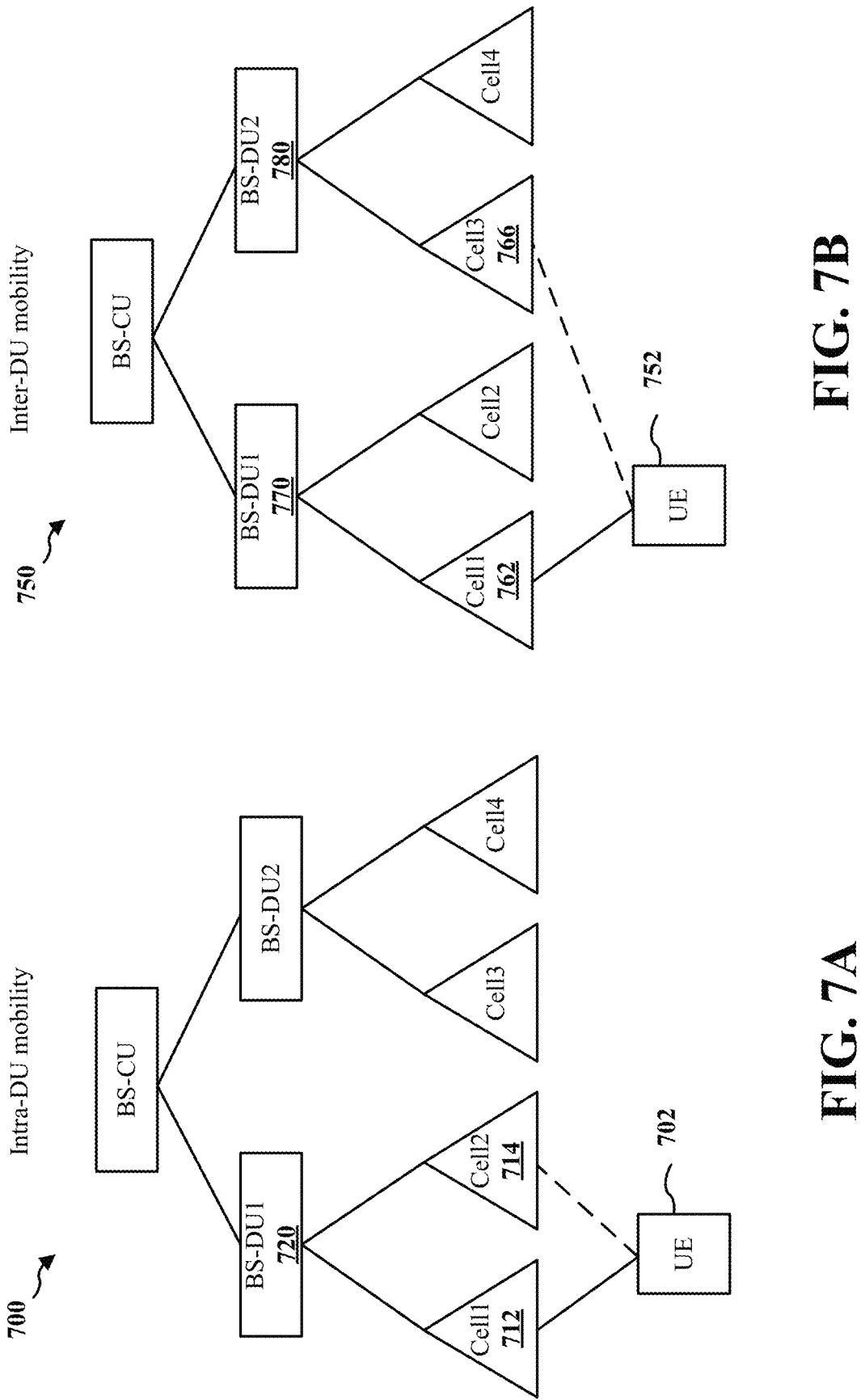
FIG. 7A and FIG. 7B are diagrams illustrating an L2 reset during lower layer mobility.

FIGS. 7A and 7B are diagrams illustrating an L2 reset during lower layer mobility. FIG. 7A is a diagram 700 illustrating an L2 reset for intra-DU mobility. As shown in FIG. 7A, the serving cell for the UE 702 may originally be a source cell (e.g., Cell 1 712), and the serving cell may be changed to a target cell (e.g., Cell 2 714). Both Cell 1 712 and Cell 2 714 are served by the same DU (BS-DU1 720). Hence, the RLC endpoint does not change when the serving cell is changed from Cell 1 712 to Cell 2 714. The UE 702 can skip performing an L2 reset (e.g., reset MAC or RLC, or recover PDCP) for this serving cell change. Although the example is described for resetting the MAC or RLC, the UE may skip reestablishing the MAC or skip reestablishing the RLC in other aspects. A UE may have multiple RLC entities corresponding to multiple logical channels. The reset or reestablishment instruction may be selective, e.g., indicating for the UE to perform a reset or reestablishment action for one RLC entity but not the other. For example, the UE may skip the RLC reset/reestablishment for a subset of RLC entities and may perform the RLC reset/reestablishment for another subset of the RLC entities. Similarly, the UE may have multiple PDCP entities associated with different radio bearers of the UE, and PDCP recovery can also be selective. For example, the UE may skip PDCP recovery for one or PDCP entities and may perform PDCP for other PDCP entities. FIG. 7B is a diagram 750 illustrating an L2 reset for inter-DU mobility. As shown in FIG. 7B, the serving cell for the UE 752 may originally be a source cell (e.g., Cell 1 762), and the serving cell may be changed to a target cell (e.g., Cell 3 766). Cell 1 762 and Cell 3 766 are respectively served by different DUs (e.g., BS-DU1 770 for Cell 1 762, and BS-DU2 780 for Cell 3 766). Hence, the RLC endpoint changes when the serving cell is changed from Cell 1 762 to Cell 3 766. The UE 752 may perform an L2 reset (e.g., a MAC layer reset or reestablishment, an RLC layer reset or reestablishment, or a PDCP layer recovery due to possible packet loss) for this serving cell change.

Whether a UE is to perform an L2 reset (e.g., a MAC layer reset or reestablishment, an RLC layer reset or reestablishment, or a PDCP layer recovery) may depend on the selected target cell or cell group for mobility. As the network architecture is transparent to the UE, the UE may determine whether to do an L2 reset based on configurations or signaling from the network. In one example, the cell-switch command, e.g., MAC-CE or DCI, received on the source cell (e.g., Cell 1 712 in FIG. 7A or Cell 1 762 in FIG. 7B) and triggering a change of cells, may indicate whether an L2 reset is needed. For example, the UE may receive L1 (DCI) or L2 (MAC-CE) signaling that indicates for the UE to switch to Cell 2 714 and to skip the L2 reset. The UE may receive L1 or L2 signaling indicating for the UE to switch to Cell 3 766 and to perform an L2 reset. As described in connection with FIG. 6, additionally or alternatively, the switch may be from one cell group to another cell group.

In some aspects, the overhead of L2 indication for L2 reset (and for L3 indications of an L2 reset) may be reduced, and UE security can be further provided by configuring (in L3/RRC configuration for L1/L2 inter-cell mobility) conditions or information for L2 reset that the UE can use to determine whether to perform an L2 reset when a cell change is triggered by L1/L2 signaling. By providing the L2 reset information in L3 signaling, which is security protected, the information may have added security that is not provided in a MAC-CE. As well, the MAC CE provides more dynamic signaling, whereas the association of cells and DUs may be stationary. As the L2 reset may depend whether the source and target cells are under the same or different DUs, which may be stationary, the configuration in RRC signaling may be used rather than MAC-CE signaling.

For example, the RRC configuration of the target cell (e.g., Cell 2 714 in FIG. 7A or Cell 3 766 in FIG. 7B) may indicate whether an L2 reset is needed upon the target cell selection. While the UE is served on cell1 (or cell group 1), the UE may receive candidate RRC configurations associated with a set of candidate cells or cell groups: in this example, cells 2, 3 and 4 (or cell groups 2, 3, and 4). The candidate RRC configuration associated with cell 2 indicates no L2 reset, while that of cells 3 and 4 configure L2 reset. The UE may apply a candidate RRC configuration if the UE receives a command to switch to the associated cell or cell group.

However, this configuration may include additional signaling to support successive lower layer cell switches. When the RRC configuration of the target cell is used to indicate whether an L2 reset is needed, the RRC configurations of the target cells may not be updated at every instance of lower layer mobility (otherwise, the RRC overhead would be similar to that of L3 mobility). In some aspects, the RRC configuration may indicate whether L2 reset is needed or not depending on the source and target cells or cell groups in the subsequent cell/cell group switches following the RRC configuration.

Figures 8A, 8B:
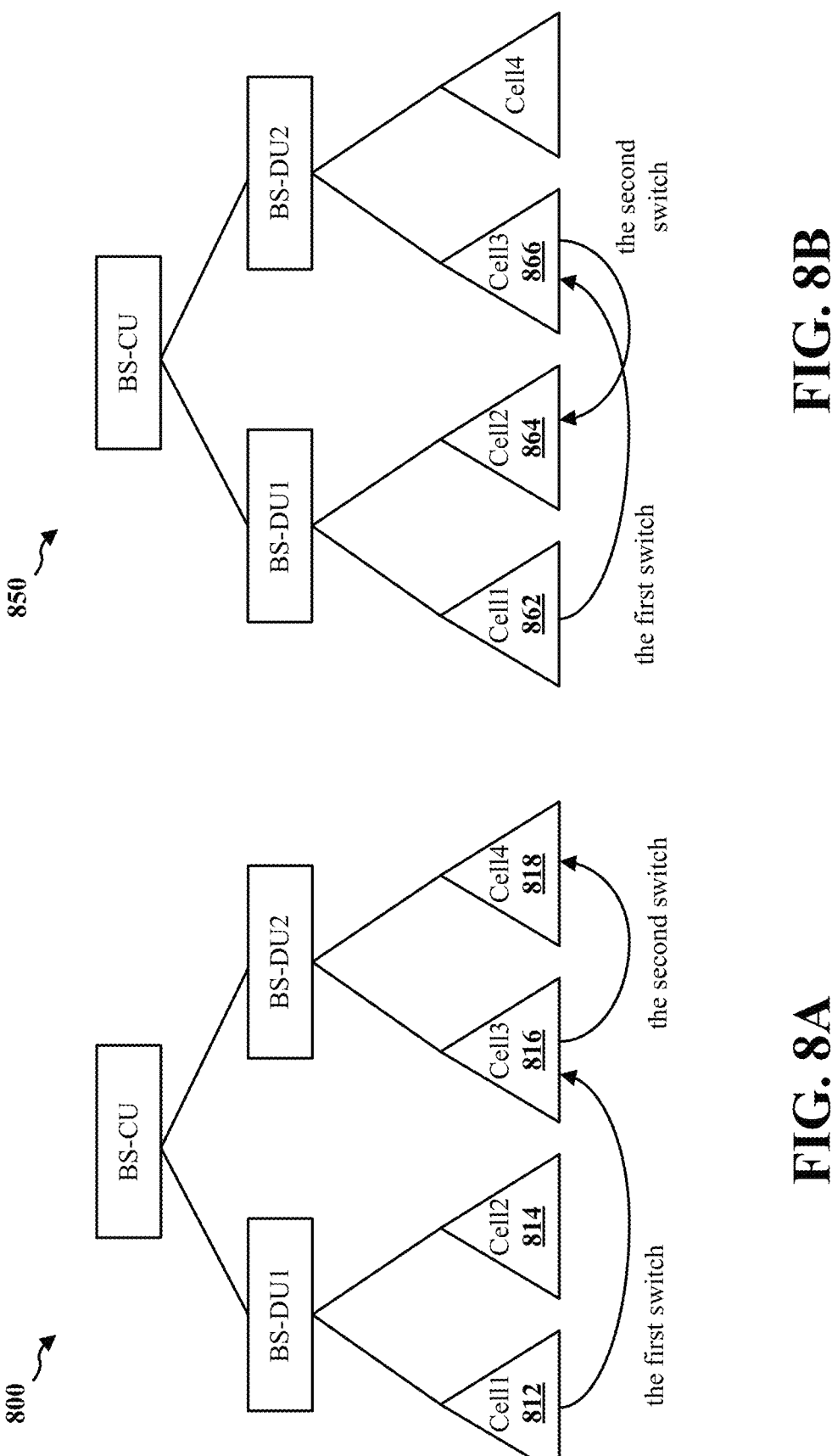
FIG. 8A and FIG. 8B are diagrams illustrating successive lower layer cell switches.

FIG. 8A is a diagram 800 illustrating successive lower layer cell switches. As shown in FIG. 8A, a UE may initially connect to Cell 1 812 (the source cell), and the UE may receive RRC configurations associated with potential target cells (e.g., Cell 2 814, Cell 3 816, and Cell 4 818). The RRC configurations of potential target cells may assume Cell 1 812 is the source cell. Hence, the configuration for Cell2 814 may indicate that no L2 reset is needed (since the switch from Cell 1 812 to Cell 2 814 is intra-DU mobility), and the configurations for Cell 3 816 and Cell 4 818 may indicate that an L2 reset is needed (since the switch from Cell 1 812 to Cell 3 816 (or Cell 4 818) is inter-DU mobility). After the UE switches the serving cell from Cell 1 812 to one of the target cells, these configurations may become outdates (for the purpose indicating L2 reset) for the next serving cell switch. For example, as shown in FIG. 8A, the RRC configuration for Cell 4 818 may indicate that an L2 reset is needed if Cell 4 818 is the target cell in a serving cell switch (because it assumes Cell 1 812 is the source cell). However, if the UE makes two successive serving cell switches: the first switch from Cell 1 812 to Cell 3 816, and the second switch from Cell 3 816 to Cell 4 818. The RRC configuration for Cell 4 becomes outdated and does not provide accurate indication regarding the L2 reset when the UE made the second serving cell switch, as performing an L2 reset can be skipped when switching from Cell 3 816 to Cell 4 818, as they are served by the same DU. FIG. 8B is a diagram 850 illustrating another example of successive lower layer cell switches. As shown in FIG. 8B, the RRC configuration for Cell 2 864 may indicate that no L2 reset is needed if Cell 2 864 is the target cell in a serving cell switch (since it assumes Cell 1 862 is the source cell). However, if the UE makes two successive serving cell switches: the first switch from Cell 1 862 to Cell 3 866, and the second switch from Cell 3 866 to Cell 2 864. The RRC configuration for Cell 2 864 becomes outdated and does not provide accurate indication regarding the L2 reset when the UE made the second serving cell switch, as the UE is to perform an L2 reset in response to switching from Cell 3 866 to Cell 2 864 because the cells are served by different DUs.

The present disclosure provides methods and apparatus for the determination of L2 reset in lower layer mobility in a way that provides security and enables a reduction in signaling overhead. The methods and apparatus reduce the communication overhead compared with L3 mobility and support successive serving cell switches.

In one aspect of the present disclosure, a UE may receive RRC configurations associated with the candidate target cells. For example, referring to FIG. 6, the candidate target cells may be Cell 2 614, Cell 3 616, and Cell4 618, and the UE 602 may receive RRC configuration associated with Cell 2 614, Cell 3 616, and Cell 4 618. Additionally, the UE may further receive, in RRC, a grouping of the cells (which may include the candidate target cells and the current serving cell). The grouping may indicate one or more of: the associations between the cells and the BS-DUs, the associations between the cells and the BS-CUs, and the associations between the cells and TRPs. For example, referring to FIG. 6, the grouping of the cells may indicate that Cell 1 812 and Cell 2 814 are associated with the same DU (BS-DU1 620) and therefore are in a same first DU group, and Cell 3 616 and Cell 4 618 are associated with the same DU (BS-DU2 630) and therefore are in a same second DU group. In this disclosure, the cells in the same DU group (or CU group, TRP group) may be the cells that associated with the same DU (or CU, TRP). For example, referring to FIG. 6, Cell 1 612 and Cell 2 614 are in the same DU group as they are associated with same BS-DU1 620, and Cell 2 614 and Cell 3 616 are in different DU groups as they are associated with different DUs.

The UE may determine whether to perform an L2 reset based on whether the source cell and the target cell are in the same group (e.g., DU group, CU group, or TRP group). For example, referring to FIG. 6, the grouping of cells may indicate that Cell 1 612 and Cell 3 616 are in different DU group. Hence, when the UE 602 makes a serving cell switch to change the serving cell from Cell 1 612 to Cell 3 616, an L2 reset is needed for this serving cell switch. After the serving cell is changed to Cell 3 616, if the UE may make a second serving cell switch to change the serving cell from Cell 3 616 to, e.g., Cell 4 618, no L2 reset is needed for the second serving cell switch since the grouping of cells indicates that Cell 3 616 and Cell 4 618 are in the same DU group.

Depending on the grouping of cells, the UE may further determine whether to perform a partial L2 reset or whether to perform RACH based on whether the source and the target cells are in the same group or different groups. The UE may receive separate groupings, where the UE uses a first grouping to determine whether to perform a first action upon mobility, and a second grouping to determine whether to perform the second action upon mobility. The action performed by the UE refers to the different examples of L2 reset or reestablishment, PDCP recovery, RACH, etc. The UE may further determine which measurement configuration to apply based on whether the source and the target cells are in the same group or different groups.

The grouping for reset may be based on cell groups for the L1/L2 mobility cell group switch. For example, the UE may receive a grouping of cell groups, which may indicate, for example, cell group 1 and cell group 2 are associated with the same first DU (or CU, TRP), and cell group 3, and cell group 4 are associated with the same second DU (or CU, TRP). Hence, cell group 1 and cell group 2 are in the first DU (or CU, TRP) group, and cell group 3 and cell group 4 are in the second DU (or CU, TRP) group. The UE may perform a reset or any of the above actions based on whether the source cell groups and the target cell groups of the switch are in the same DU (or CU, TRP) group or different DU (or CU, TRP) groups.

In some aspects, the UE may receive an indication on whether to perform an L2 reset in the target cell RRC configuration for each candidate target cell. The L2 reset may include one or more of: a MAC layer reset or reestablishment, an RLC layer reset or reestablishment, or a PDCP layer recovery. A description of a MAC reset is provided in section 5.12 of TS 38.321 v17.2.0, for example, and may include any subset of the listed functions (e.g., including any of stop running one or more timers; set NDIs for all uplink HARQ processes to 0; set the NDIs for all HARQ process IDs to 0; stop any ongoing random access procedures; discard signaling contention-free random access resources; flush a Msg 3 buffer; flush a MSGA buffer; cancel one or more of a triggered scheduling request procedures, BSR procedures, power headroom reporting procedures, LBT failure, BFR, timing advance reporting procedure, recommended bit rate query procedure, configured uplink/sidelink grant confirmation, configured sidelink grant confirmation, a desired guard symbol query, a positioning measurement gap activation/deactivation request procedure, a triggered SDT procedure; flush soft buffers for all DL HARQ processes; for each DL HARQ process, consider the next received transmission for a TB as the first transmission; release any temporary C-RNTI; reset BFI counters; reset LBT counters, among other aspects of a MAC reset). A description of RLC entity handling reestablishment may be found in section 5.1 of TS 38.322 v17.1.0, for example and may include any subset of the listed functions (e.g., including any of discarding all RLC SDUs, RLC SDU segments, and RLC PDUs; stop and reset all timers; and reset all state variables to their initial values, among other aspects of an RLC reestablishment). When the UE receives a cell switch command, the cell switch command may indicate whether to activate or deactivate or overwrite the RRC configuration in full or in part (e.g., do a full reset or a partial reset) for the target cell. For example, referring to FIG. 6, the UE 602 may receive an indication on whether to perform an L2 reset (e.g., a MAC reset or other L2 resets) for each of the candidate target cells (i.e., Cell 2 614, Cell 3 616, and Cell 4 618) in RRC configuration for these cells. When the UE 602 receives a cell switch command to switch, for example, the serving cell to from Cell 1 612 to Cell 2 614, the cell switch command may indicate whether to activate or deactivate or overwrite the RRC configuration in full or in part for Cell 2 614.

In some aspects, the UE may perform a cell switch and apply the associated target cell configuration. The UE may further receive a separate indication on the target cell (via RRC or lower layer signaling) indicating whether to do an L2 reset, a partial reset, or no reset. For example, referring to FIG. 6, the UE 602 may receive a target cell configuration for each of the candidate target cells (i.e., Cell 2 614, Cell 3 616, and Cell 4 618) in RRC configuration for these cells. When the UE 602 receives a cell switch command to switch, for example, the serving cell from Cell 1 612 to Cell 2 614, the UE may switch the serving cell to Cell 2 614 and apply the associated configuration for Cell 2 614. The UE may further receive a separate indication on Cell 2 614 (via RRC or lower layer signaling) on whether to do an L2 reset, a partial reset, or no reset.

FIG. 9 is a call flow diagram 900 illustrating a method of wireless communication in accordance with various aspects of this present disclosure. Although aspects are described for a base station 904, the aspects may be performed by a base station in aggregation and/or by one or more components of a base station 904 (e.g., a CU 110, a DU 130, and/or an RU 140).

As shown in FIG. 9, at 906, a UE 902 may receive a configuration of multiple candidate cells for L1 or L2 inter-cell mobility from a base station 904. In some aspects, the configuration may be received via RRC. For example, referring to FIG. 6, the UE 602 may receive a configuration of multiple candidate cells for L1 or L2 inter-cell mobility from a base station. The multiple candidate cells may include Cell 2 612, Cell 3 616, and Cell 4 618.

At 908, the UE 902 may receive information about an L2 reset when switching between the multiple candidate cells from base station 904. In some aspects, the information about the L2 reset may be a grouping of the multiple candidate cells indicating the association of the candidate cells with DUs (or CUs, TRPs) of the base station. For example, referring to FIG. 6, the grouping may indicate that Cell 1 612 and Cell 2 614 are associated the same DU, and Cell 3 616 and Cell 4 618 are associated with the same DU.

At 910, the UE 902 may receive one or more cell IDs or indications of cell IDs from base station 904. In some aspects, the one or more cell IDs or indications of cell IDs may respectively identify the one or more target cells in the multiple candidate cells for a serving cell switch. In some aspects, the UE 902 may receive the one or more cell IDs or indications of cell IDs through MAC-CE.

At 912, the UE 902 may perform the serving cell switch within the candidate cells for the UE 902 in response to an L1 or L2 signaling. For example, referring to FIG. 7A, the UE 702 may perform the serving cell switch to change the serving cell from Cell 1 712 to Cell 2 714.

At 914, the UE 902 may reset or reuse an L2 cell configuration, in response to the serving cell switch and based on the information. For example, referring to FIG. 7A, the information the UE 702 received may indicate that the source cell and the target cell (i.e., Cell 1 712 and Cell 2 714) are in the same DU group. Hence, the UE 702 may reuse the L2 cell configuration (i.e., no L2 reset is needed). In another example, referring to FIG. 7B, when the serving cell is changed from Cell 1 762 to Cell 3 766, the information the UE 752 received may indicate that the source cell and the target cell (i.e., Cell 1 762 and Cell 3 766) are in different DU groups. Hence, the UE 752 may reset the L2 cell configuration. Although not illustrated, the UE may continue to perform subsequent cell switches to different cells in the L1/L2 inter-cell mobility candidate set that was RRC configured for the UE, such as described in connection with FIGS. 8A and 8B.

In some aspects, each LTM candidate configuration for a candidate cell group (e.g., the RRC configuration in 906) may be assigned a field ltm-NoResetID. The initial serving cell group configuration of the UE may be assigned a field ltm-ServingCellNoResetID. At each LTM execution, the UE may check whether ltm-ServingCellNoResetID of its current serving cell or cell group is the same or different as the ltm-NoResetID of the target cell or cell group. If they are the same, no L2 reset is necessary. If they differ, the UE may perform L2 reset. After the LTM execution, the UE may update the value of ltm-ServingCellNoResetID to ltm-NoResetID of the new cell group. These steps may be repeated for every subsequent LTM execution.

In some examples, the field ltm-NoResetID may indicate whether the UE should skip the L2 reset when an LTM cell switch procedure is executed toward an LTM candidate. For example, if the value of ltm-NoResetID in the LTM candidate cell is the same as the value of ltm-ServingCellNoResetID in the serving cell of a cell group, then the UE may not perform any L2 reset during an LTM cell switch procedure.

In some examples, the field ltm-ServingCellNoResetID may be used by the UE to determine whether an L2 reset may be performed when an LTM cell switch procedure is executed toward an LTM candidate cell. For example, if the value of ltm-NoResetID in an LTM candidate cell is the same as the value of ltm-ServingCellNoResetID in the serving cell of a cell group, the UE may not perform any L2 reset during the LTM cell switch procedure.

FIG. 10 is a flowchart 1000 illustrating methods of wireless communication at a UE in accordance with various aspects of the present disclosure. The method may be performed by a UE. The UE may be the UE 104, 350, 702, 752, 902, or the apparatus 1404 in the hardware implementation of FIG. 14. The method enables single or successive serving cell switches through lower layer (e.g., L2) inter-cell mobility. Hence, it reduces the communication overhead when switching the serving cell. Additionally, by transmitting information related to the serving cell switch via multiple indications, the security of wireless communication is improved.

As shown in FIG. 10, at 1002, the UE may receive, via RRC, a configuration of multiple candidate cells for L1 or L2 inter-cell mobility from a network entity. The network entity may be a base station, or a component of a base station, in the access network of FIG. 1 or a core network component (e.g., base station 102, 310; base station 904; or the network entity 1402 in the hardware implementation of FIG. 14). FIGS. 6, 7A, 7B, and 9 illustrate various aspects of the steps in connection with flowchart 1000. For example, referring to FIG. 9, the UE 902 may receive, at 906, via RRC, a configuration of multiple candidate cells for L1 or L2 inter-cell mobility from a network entity (base station 904). Referring to FIG. 6, the multiple candidate cells may include Cell 2 614, Cell 3 616, and Cell 4 618. In one aspect, the multiple candidate cells may include Cell 1 612. In some aspects, 1002 may be performed by the L2 reset reception component 198.

At 1004, the UE may receive information about an L2 reset when switching between the multiple candidate cells from the network entity. For example, referring to FIG. 9, the UE 902 may receive information about an L2 reset when switching between the multiple candidate cells from the network entity (base station 904). In some aspects, 1004 may be performed by the L2 reset reception component 198.

At 1006, the UE may perform a serving cell switch within the candidate cells for the UE in response to L1 or L2 signaling. For example, referring to FIG. 9, the UE 902 may perform, at 912, a serving cell switch within the candidate cells for the UE in response to L1 or L2 signaling. In some aspects, 1006 may be performed by the L2 reset reception component 198.

At 1008, the UE may reset or reuse an L2 cell configuration, in response to the serving cell switch, and based on the information. For example, referring to FIG. 9, the UE 902 may, at 914, reset or reuse an L2 cell configuration, in response to the serving cell switch and based on the information the UE 902 receives at 908. In some aspects, 1008 may be performed by the L2 reset reception component 198.

FIG. 11 is a flowchart 1100 illustrating methods of wireless communication at a UE in accordance with various aspects of the present disclosure. The method may be performed by a UE. The UE may be the UE 104, 350, 702, 752, 902, or the apparatus 1404 in the hardware implementation of FIG. 14. The method enables single or successive serving cell switches through lower layer (e.g., L2) inter-cell mobility. Hence, it reduces the communication overhead when switching the serving cell. Additionally, by transmitting information related to the serving cell switch via multiple indications, the security of wireless communication is improved.

As shown in FIG. 11, at 1102, the UE may receive, via RRC, a configuration of multiple candidate cells for L1 or L2 inter-cell mobility from a network entity. The network entity may be a base station, or a component of a base station, in the access network of FIG. 1 or a core network component (e.g., base station 102, 310; base station 904; or the network entity 1402 in the hardware implementation of FIG. 14).

FIGS. 6, 7A, 7B, and 9 illustrate various aspects of the steps in connection with flowchart 1100. For example, referring to FIG. 9, the UE 902 may receive, at 906, via RRC, a configuration of multiple candidate cells for L1 or L2 inter-cell mobility from a network entity (base station 904). Referring to FIG. 6, the multiple candidate cells may include Cell 2 614, Cell 3 616, and Cell 4 618. In one aspect, the multiple candidate cells may include Cell 1 612. In some aspects, 1102 may be performed by the L2 reset reception component 198.

At 1104, the UE may receive information about an L2 reset when switching between the multiple candidate cells from the network entity. For example, referring to FIG. 9, the UE 902 may receive information about an L2 reset when switching between the multiple candidate cells from the network entity (base station 904). In some aspects, 1104 may be performed by the L2 reset reception component 198.

At 1108, the UE may perform a serving cell switch within the candidate cells for the UE in response to L1 or L2 signaling. For example, referring to FIG. 9, the UE 902 may perform, at 912, a serving cell switch within the candidate cells for the UE in response to L1 or L2 signaling. In some aspects, 1108 may be performed by the L2 reset reception component 198.

At 1110, the UE may reset or reuse an L2 cell configuration, in response to the serving cell switch, and based on the information. For example, referring to FIG. 9, the UE 902 may, at 914, reset or reuse an L2 cell configuration, in response to the serving cell switch and based on the information the UE 902 receives at 908. In some aspects, 1110 may be performed by the L2 reset reception component 198.

In some aspects, the information may include a grouping of the multiple candidate cells and may include one or more cell groups of the multiple candidate cells according to one or more of: first associations of each of the multiple candidate cells with one or more DUs of the network entity; second associations of each of the multiple candidate cells with one or more CUs of the network entity; and third associations of each of the multiple candidate cells with one or more TRPs of the network entity. For example, referring to FIG. 6, the information may include a grouping of the multiple candidate cells (e.g., Cell 2 614, Cell 3 616, Cell 4 618). The grouping of the multiple candidate cells may indicate that Cell 1 612 and Cell 2 614 are associated with the same DU (BS-DU1) and therefore are in the same DU group (the DU group for BS-DU1 620), and Cell 3 616 and Cell 4 618 are associated with the same DU (BS-DU2 630) and therefore are in the same DU group (the DU group for BS-DU2 630).

In some aspects, to perform the serving cell switch within the candidate cells for the UE, the UE may be configured to change one or more serving cells connected to the UE from one or more source cells to one or more target cells. The one or more source cells and the one or more target cells may be within the multiple candidate cells. For example, referring to FIG. 7A, to perform the serving cell switch within the candidate cells for the UE 702, the UE 702 may be configured to change one or more serving cells connected to the UE 702 from one or more source cells (Cell 1 712) to one or more target cells (Cell 2 714). The one or more source cells and the one or more target cells may be within the multiple candidate cells.

In some aspects, to reset or reuse the L2 cell configuration, the UE may be configured to: reset the L2 cell configuration of the UE in response to the one or more target cells and the one or more source cells in different cell groups of the one or more cell groups; or reuse the L2 cell configuration for the source cell for the UE in response to the one or more target cells and the one or more source cells in a same cell group of the one or more cell groups. For example, referring to FIG. 7B, the UE 752 may be configured to: reset the L2 cell configuration of the UE in response to the one or more target cells (Cell 3 766) and the one or more source cells (Cell 1 762) in different cell groups of the one or more cell groups (Cell 1 762 and Cell 3 766 are in different DU groups). Referring to FIG. 7A, the UE 702 may be configured to reuse the L2 cell configuration for the source cell for the UE 702 in response to the one or more target cells (Cell 2 714) and the one or more source cells (Cell 1 712) in a same cell group of the one or more cell groups (Cell 1 and Cell 2 are in the same DU group).

In some aspects, to reset the L2 cell configuration of the UE, the UE may be configured to perform one or more of: a MAC layer reset or reestablishment; an RLC layer reset or reestablishment; or a PDCP layer recovery. For example, referring to FIG. 7B, when the UE 752 reset the L2 cell configuration, the UE 752 may be configured to perform one or more of: a MAC layer reset or reestablishment; an RLC layer reset or reestablishment; or a PDCP layer recovery.

In some aspects, to change the one or more serving cells connected to the UE, the UE may be further configured to: perform a partial L2 layer reset based on a grouping of the one or more target cells and the one or more source cells in the grouping of the multiple candidate cells. For example, referring to FIG. 9, to change the one or more serving cells connected to the UE 902, the UE 902 may be further configured to: perform a partial L2 layer reset based on a grouping of the one or more target cells and the one or more source cells in the grouping of the multiple candidate cells (which the UE 902 received at 908).

In some aspects, to change the one or more serving cells connected to the UE, the UE may be further configured to perform a RACH procedure based on a grouping of the one or more target cells and the one or more source cells in the grouping of the multiple candidate cells. For example, referring to FIG. 9, to change the one or more serving cells connected to the UE 902, the UE 902 may be further configured to perform a RACH procedure based on a grouping of the one or more target cells and the one or more source cells in the grouping of the multiple candidate cells (which the UE 902 received at 908).

In some aspects, to change the one or more serving cells connected to the UE, the UE may be further configured to select a measurement configuration for the UE based on a grouping of the one or more target cells and the one or more source cells in the grouping of the multiple candidate cells. For example, referring to FIG. 9, to change the one or more serving cells connected to the UE 902, the UE 902 may be further configured to select a measurement configuration for the UE 902 based on a grouping of the one or more target cells and the one or more source cells in the grouping of the multiple candidate cells (which the UE 902 received at 908).

In some aspects, at 1106, the UE may be configured to receive, via a MAC-CE or DCI, one or more cell IDs or indications of cell IDs from the network entity. The one or more cell IDs or indications of cell IDs may respectively identify the one or more target cells in the multiple candidate cells. For example, referring to FIG. 9, the UE 902 may receive, at 910, via a MAC-CE or DCI, one or more cell IDs or indications of cell IDs from the network entity (base station 904). In some examples, the indications of cell IDs may be indices of configurations associated with the one or more target cells. The one or more cell IDs or indications of cell IDs may respectively identify the one or more target cells in the multiple candidate cells. In some aspects, 1106 may be performed by the L2 reset reception component 198.

In some aspects, at 1112, the information may include an indication in a MAC-CE or DCI that indicates whether to reset an L2 cell configuration in response to the serving cell switch. For example, referring to FIG. 9, the information (the UE 902 received at 908) may include an indication in a MAC-CE or DCI that indicates whether to reset an L2 cell configuration in response to the serving cell switch.

In some aspects, at 1114, the information may be included in an indication from a target cell. The indication may indicate whether to reset an L2 cell configuration for the target cell in response to the serving cell switch. For example, referring to FIG. 7A, when the UE 702 performs a serving cell switch to change the serving cell from Cell 1 712 to Cell 2 714, the information may be included in an indication from a target cell (Cell 2 714). The indication may indicate whether to reset an L2 cell configuration for the target cell (Cell 2 714) in response to the serving cell switch.

In some aspects, at 1116, the information may be based on a presence or an absence of an indication from a target cell. The presence or the absence of the indication may indicate whether to reset an L2 cell configuration for the target cell in response to the serving cell switch. For example, referring to FIG. 7A, when the UE 702 performs a serving cell switch to change the serving cell from Cell 1 712 to Cell 2 714, the information may be based on a presence or an absence of an indication from the target cell (Cell 2 714). The presence or the absence of the indication may indicate whether to reset an L2 cell configuration for the target cell (Cell 2 714) in response to the serving cell switch.

In some aspects, to reset or reuse the L2 cell configuration, the UE may be configured to: reuse the L2 cell configuration after the serving cell switch based on the absence of the indication; or reset the L2 cell configuration after the serving cell switch based on the presence of the indication. For example, referring to FIG. 7A, when the UE 702 performs a serving cell switch to change the serving cell from Cell 1 712 to Cell 2 714, the UE 702 may be configured to: reuse the L2 cell configuration after the serving cell switch based on the absence of the indication; or reset the L2 cell configuration after the serving cell switch based on the presence of the indication.

Figure 12:
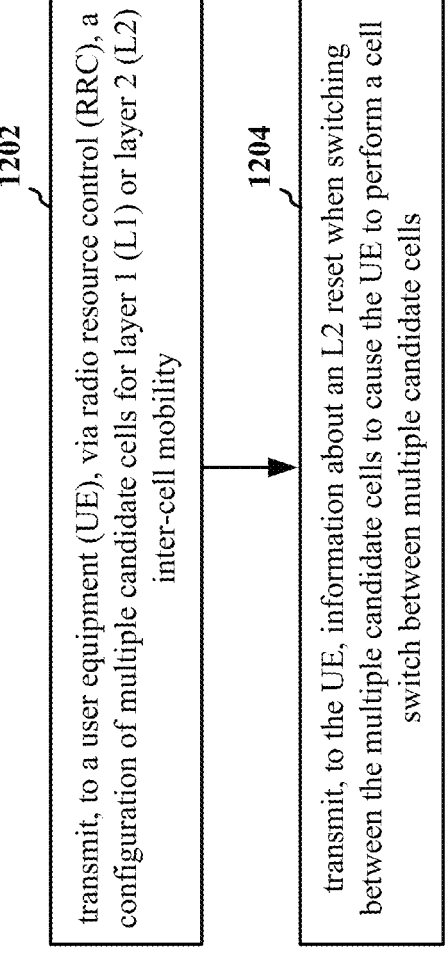
FIG. 12 is the first flowchart illustrating methods of wireless communication at a network entity in accordance with various aspects of the present disclosure.

FIG. 12 is a flowchart 1200 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 904; or the network entity 1402 in the hardware implementation of FIG. 14). The method enables single or successive serving cells switches through lower layer (e.g., L2) inter-cell mobility. Hence, it reduces the communication overhead when switching the serving cell. Additionally, by transmitting information related to the serving cell switch via multiple indications, the security of wireless communication is improved.

As shown in FIG. 12, at 1202, the network entity may transmit, via RRC, a configuration of multiple candidate cells for L1 or L2 inter-cell mobility to a UE. The UE may be the UE 104, 350, 702, 752, 902, or the apparatus 1404 in the hardware implementation of FIG. 14. FIGS. 6, 7A, 7B, and 9 illustrate various aspects of the steps in connection with flowchart 1200. For example, referring to FIG. 9, the network entity (base station 904) may transmit, via RRC, a configuration of multiple candidate cells for L1 or L2 inter-cell mobility to a UE 902. Referring to FIG. 6, the multiple candidate cells may include Cell 2 614, Cell 3 616, and Cell 4 618. In one aspect, the multiple candidate cells may include Cell 1 612. In some aspects, 1202 may be performed by the L2 reset indication component 199.

At 1204, the network entity may transmit, to the UE, information about an L2 reset when switching between the multiple candidate cells to cause the UE to perform a cell switch between multiple candidate cells. For example, referring to FIG. 9, the network entity (base station 904) may transmit, at 908, to the UE 902, information about an L2 reset when switching between the multiple candidate cells to cause the UE 902 to perform, at 912, a cell switch between multiple candidate cells. In some aspects, 1204 may be performed by the L2 reset indication component 199.

FIG. 13 is a flowchart 1300 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 904; or the network entity 1402 in the hardware implementation of FIG. 14). The method enables single or successive serving cells switches through lower layer (e.g., L2) inter-cell mobility. Hence, it reduces the communication overhead when switching the serving cell. Additionally, by transmitting information related to the serving cell switch via multiple indications, the security of wireless communication is improved.

As shown in FIG. 13, at 1302, the network entity may transmit, via RRC, a configuration of multiple candidate cells for L1 or L2 inter-cell mobility to a UE. The UE may be the UE 104, 350, 702, 752, 902, or the apparatus 1404 in the hardware implementation of FIG. 14. FIGS. 6, 7A, 7B, and 9 illustrate various aspects of the steps in connection with flowchart 1300. For example, referring to FIG. 9, the network entity (base station 904) may transmit, via RRC, a configuration of multiple candidate cells for L1 or L2 inter-cell mobility to a UE 902. Referring to FIG. 6, the multiple candidate cells may include Cell 2 614, Cell 3 616, and Cell 4 618. In one aspect, the multiple candidate cells may include Cell 1 612. In some aspects, 1302 may be performed by the L2 reset indication component 199.

At 1304, the network entity may transmit, to the UE, information about an L2 reset when switching between the multiple candidate cells to cause the UE to perform a cell switch between multiple candidate cells. For example, referring to FIG. 9, the network entity (base station 904) may transmit, at 908, to the UE 902, information about an L2 reset when switching between the multiple candidate cells to cause the UE 902 to perform, at 912, a cell switch between multiple candidate cells. In some aspects, 1304 may be performed by the L2 reset indication component 199.

In some aspects, the UE may perform the cell switching between multiple candidate cell by: performing, in response to L1 or L2 signaling, a serving cell switch within the candidate cells for the UE, and resetting or reusing an L2 cell configuration, in response to the serving cell switch, and based on the information. For example, referring to FIG. 9, the UE 902 may, at 914, reset or reuse an L2 cell configuration, in response to the serving cell switch and based on information the UE 902 receives at 908.

In some aspects, the information may include a grouping of the multiple candidate cells and may include one or more cell groups of the multiple candidate cells according to one or more of: first associations of each of the multiple candidate cells with one or more DUs of the network entity; second associations of each of the multiple candidate cells with one or more CUs of the network entity; and third associations of each of the multiple candidate cells with one or more TRPs of the network entity. For example, referring to FIG. 6, the information may include a grouping of the multiple candidate cells (e.g., Cell 2 614, Cell 3 616, Cell 4 618). The grouping of the multiple candidate cells may indicate that Cell 1 612 and Cell 2 614 are associated with the same DU (BS-DU1 620) and therefore are in the same DU group (the DU group for BS-DU1 620), and Cell 3 616 and Cell 4 618 are associated with the same DU (BS-DU2 630) and therefore are in the same DU group (the DU group for BS-DU2 630).

In some aspects, to perform the serving cell switch within the candidate cells for the UE, the UE may be configured to change one or more serving cells connected to the UE from one or more source cells to one or more target cells. The one or more source cells and the one or more target cells may be within the multiple candidate cells. For example, referring to FIG. 7A, to perform the serving cell switch within the candidate cells for the UE 702, the UE 702 may be configured to change one or more serving cells connected to the UE 702 from one or more source cells (Cell 1 712) to one or more target cells (Cell 2 714). The one or more source cells and the one or more target cells may be within the multiple candidate cells.

In some aspects, to reset or reuse the L2 cell configuration, the UE may be configured to: reset the L2 cell configuration of the UE in response to the one or more target cells and the one or more source cells in different cell groups of the one or more cell groups; or reuse the L2 cell configuration for the source cell for the UE in response to the one or more target cells and the one or more source cells in a same cell group of the one or more cell groups. For example, referring to FIG. 7B, the UE 752 may be configured to: reset the L2 cell configuration of the UE in response to the one or more target cells (Cell 3 766) and the one or more source cells (Cell 1 762) in different cell groups of the one or more cell groups (Cell 1 762 and Cell 3 766 are in different DU groups). Referring to FIG. 7A, the UE 702 may be configured to reuse the L2 cell configuration for the source cell for the UE 702 in response to the one or more target cells (Cell 2 714) and the one or more source cells (Cell 1 712) in a same cell group of the one or more cell groups (Cell 1 712 and Cell 2 714 are in the same DU group).

In some aspects, to reset the L2 cell configuration of the UE, the UE may be configured to perform one or more of: a MAC layer reset or reestablishment; an RLC layer reset or reestablishment; or a PDCP layer recovery. For example, referring to FIG. 7B, when the UE 752 reset the L2 cell configuration, the UE 752 may be configured to perform one or more of: a MAC layer reset or reestablishment; an RLC layer reset or reestablishment; or a PDCP layer recovery.

In some aspects, to change the one or more serving cells connected to the UE, the UE may be further configured to: perform a partial L2 layer reset based on a grouping of the one or more target cells and the one or more source cells in the grouping of the multiple candidate cells. For example, referring to FIG. 9, to change the one or more serving cells connected to the UE 902, the UE 902 may be further configured to: perform a partial L2 layer reset based on a grouping of the one or more target cells and the one or more source cells in the grouping of the multiple candidate cells (which the UE 902 received at 908).

In some aspects, to change the one or more serving cells connected to the UE, the UE may be further configured to perform a RACH procedure based on a grouping of the one or more target cells and the one or more source cells in the grouping of the multiple candidate cells. For example, referring to FIG. 9, to change the one or more serving cells connected to the UE 902, the UE 902 may be further configured to perform a RACH procedure based on a grouping of the one or more target cells and the one or more source cells in the grouping of the multiple candidate cells (which the UE 902 received at 908).

In some aspects, to change the one or more serving cells connected to the UE, the UE may be further configured to select a measurement configuration for the UE based on a grouping of the one or more target cells and the one or more source cells in the grouping of the multiple candidate cells. For example, referring to FIG. 9, to change the one or more serving cells connected to the UE 902, the UE 902 may be further configured to select a measurement configuration for the UE 902 based on a grouping of the one or more target cells and the one or more source cells in the grouping of the multiple candidate cells (which the UE 902 received at 908).

In some aspects, at 1306, the network entity may be configured to transmit, to the UE, via a MAC-CE or DCI, one or more cell IDs or indications of cell IDs (e.g., index of configuration associated with a candidate cell). The one or more cell IDs or indications of cell IDs may respectively identify the one or more target cells in the multiple candidate cells. For example, referring to FIG. 9, the network entity (base station 904) may transmit, at 910, via a MAC-CE or DCI, one or more cell IDs or indications of cell IDs to the UE 902. In some examples, the indications of cell IDs may be indices of configurations associated with the one or more target cells. The one or more cell IDs or indications of cell IDs may respectively identify the one or more target cells in the multiple candidate cells. In some aspects, 1306 may be performed by the L2 reset indication component 199.

In some aspects, at 1308, the information may include an indication in a MAC-CE or DCI that indicates whether to reset an L2 cell configuration in response to the serving cell switch. For example, referring to FIG. 9, the information (base station 904 transmits at 908) may include an indication in a MAC-CE or DCI that indicates whether to reset an L2 cell configuration in response to the serving cell switch.

In some aspects, at 1310, the information may be included in an indication from a target cell. The indication may indicate whether to reset an L2 cell configuration for the target cell in response to the serving cell switch. For example, referring to FIG. 7A, when the UE 702 performs a serving cell switch to change the serving cell from Cell 1 712 to Cell 2 714, the information may be included in an indication from a target cell (Cell 2 714). The indication may indicate whether to reset an L2 cell configuration for the target cell (Cell 2 714) in response to the serving cell switch.

In some aspects, at 1312, the information may be based on a presence or an absence of an indication from a target cell. The presence or the absence of the indication may indicate whether to reset an L2 cell configuration for the target cell in response to the serving cell switch. For example, referring to FIG. 7A, when the UE 702 performs a serving cell switch to change the serving cell from Cell 1 712 to Cell 2 714, the information may be based on a presence or an absence of an indication from the target cell (Cell 2 714). The presence or the absence of the indication may indicate whether to reset an L2 cell configuration for the target cell (Cell 2 714) in response to the serving cell switch.

In some aspects, to reset or reuse the L2 cell configuration, the UE may be configured to: reuse the L2 cell configuration after the serving cell switch based on the absence of the indication; or reset the L2 cell configuration after the serving cell switch based on the presence of the indication. For example, referring to FIG. 7A, when the UE 702 performs a serving cell switch to change the serving cell from Cell 1 712 to Cell 2 714, the UE 702 may be configured to: reuse the L2 cell configuration after the serving cell switch based on the absence of the indication; or reset the L2 cell configuration after the serving cell switch based on the presence of the indication.

Figure 14:
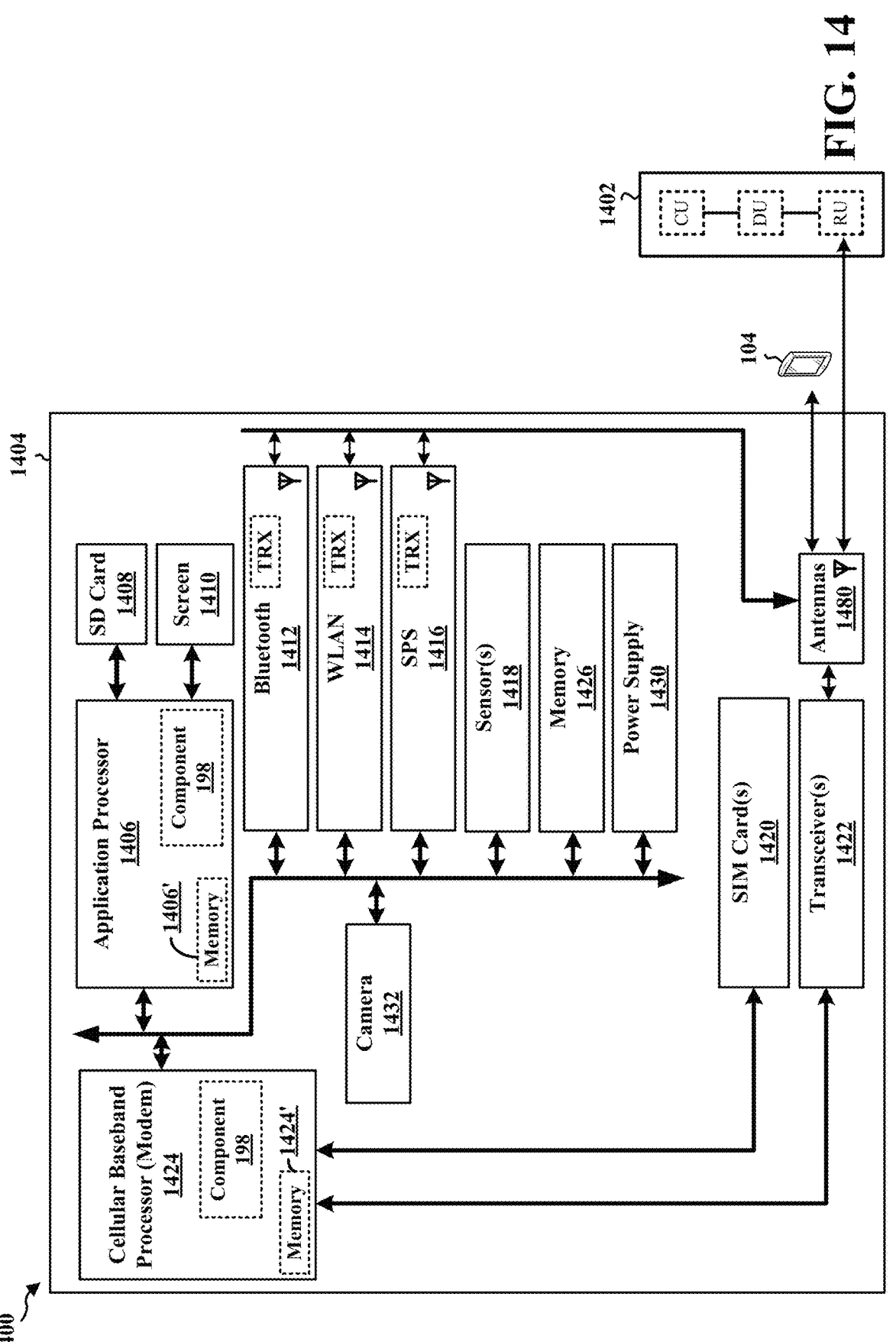
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SO-NAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the component 198 may be configured to receive, via RRC, a configuration of multiple candidate cells for L1 or L2 inter-cell mobility from a network entity; receive, from the network entity, information about an L2 reset when switching between the multiple candidate cells; perform, in response to L1 or L2 signaling, a serving cell switch within the candidate cells for the UE; and reset or reuse an L2 cell configuration, in response to the serving cell switch and based on the information. The component 198 may be further configured to perform any of the aspects described in connection with flowchart 1000 in FIG. 10 and flowchart 1100 in FIG. 11, and/or performed by the UE 902 in FIG. 9. The component 198 may be within the cellular baseband processor(s) 1424, the application processor(s) 1406, or both the cellular baseband processor(s) 1424 and the application processor(s) 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for receiving, via RRC, a configuration of multiple candidate cells for L1 or L2 inter-cell mobility from a network entity, means for receiving, from the network entity, information about an L2 reset when switching between the multiple candidate cells, means for performing, in response to L1 or L2 signaling, a serving cell switch within the candidate cells for the UE, and means for resetting or reusing an L2 cell configuration, in response to the serving cell switch and based on the information. The apparatus 1404 may further include means for performing any of the aspects described in connection with flowchart 1000 in FIG. 10 and flowchart 1100 in FIG. 11, and/or aspects performed by the UE 902 in FIG. 9. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
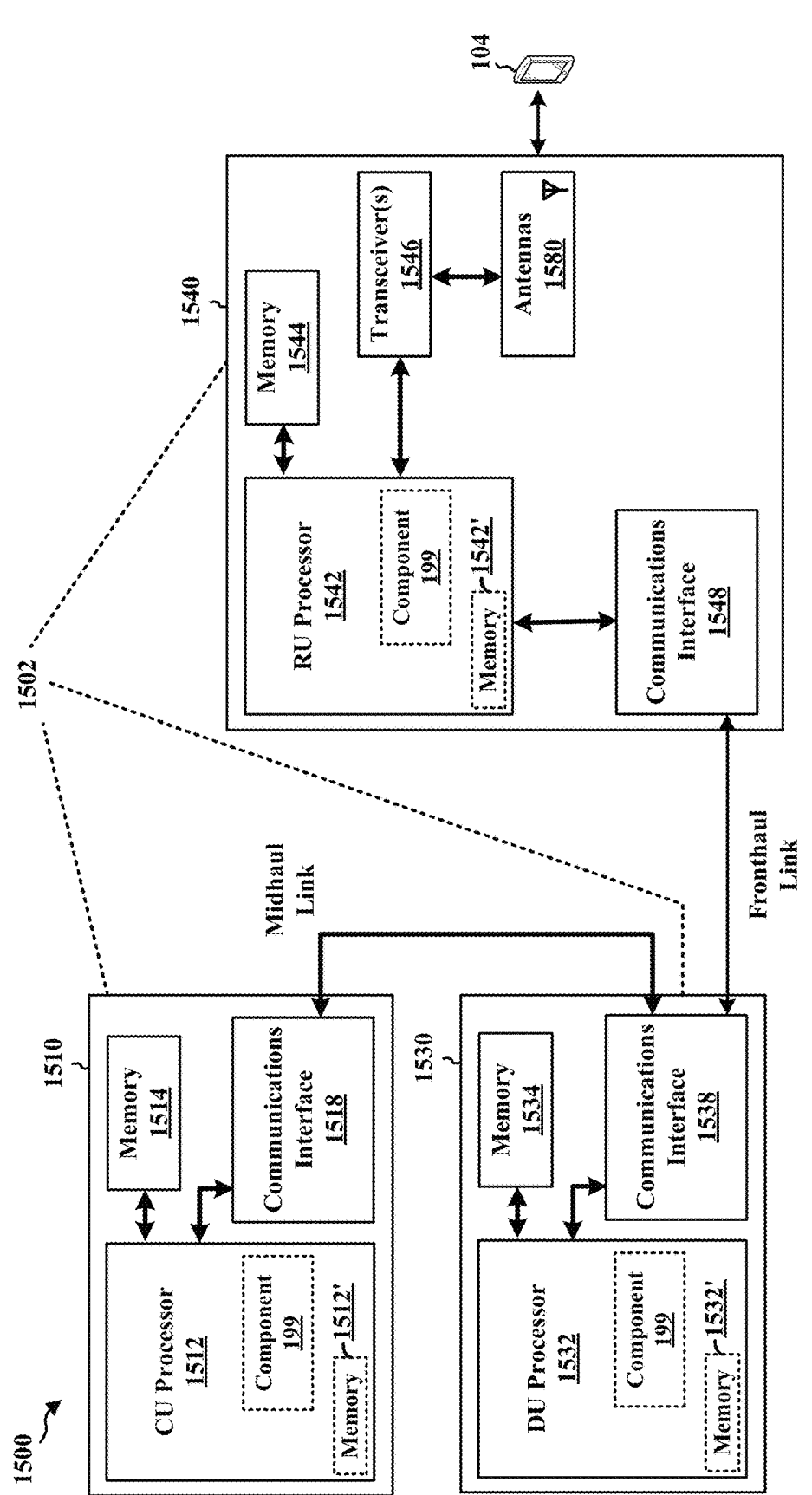
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include at least one CU processor 1512. The CU processor(s) 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include at least one DU processor 1532. The DU processor(s) 1532 may include on-chip memory 1532'. In some aspects, the DU 1530 may further include additional memory modules 1534 and a communications interface 1538. The DU 1530 communicates with the RU 1540 through a fronthaul link. The RU 1540 may include at least one RU processor 1542. The RU processor(s) 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory.

The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit, via RRC, a configuration of multiple candidate cells for L1 or L2 inter-cell mobility to a UE; and transmit, to the UE, information about an L2 reset when switching between the multiple candidate cells to cause the UE to perform a cell switch between multiple candidate cells. The UE may perform the cell switch by: performing, in response to L1 or L2 signaling, a serving cell switch within the candidate cells for the UE, and resetting or reusing an L2 cell configuration, in response to the serving cell switch, and based on the information. The component 199 may be further configured to perform any of the aspects described in connection with flowchart 1200 in FIG. 12 and flowchart 1300 in FIG. 13, and/or performed by base station 904 in FIG. 9. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 may include means for transmitting, via RRC, a configuration of multiple candidate cells for L1 or L2 inter-cell mobility to a UE, and means for transmitting, to the UE, information about an L2 reset when switching between the multiple candidate cells to cause the UE to perform a cell switch between multiple candidate cells. The UE may perform the cell switch by: performing, in response to L1 or L2 signaling, a serving cell switch within the candidate cells for the UE, and resetting or reusing an L2 cell configuration, in response to the serving cell switch, and based on the information. The network entity 1502 may further include means for performing any of the aspects described in connection with the flowchart 1200 in FIG. 12 and flowchart 1300 in FIG. 13, and/or aspects performed by base station 904 in FIG. 9. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include: receiving, via RRC, a configuration of multiple candidate cells for L1 or L2 inter-cell mobility from a network entity; receiving, from the network entity, information about an L2 reset when switching between the multiple candidate cells; performing, in response to L1 or L2 signaling, a serving cell switch within the candidate cells for the UE; and resetting or reusing an L2 cell configuration, in response to the serving cell switch and based on the information. The method enables single or successive the serving cell switches through lower layer (e.g., L2) inter-cell mobility. Hence, it reduces the communication overhead when switching the serving cell. Additionally, by transmitting information related to the serving cell switch via multiple indications, the security of wireless communication is improved.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes receiving, from a network entity, via RRC, a configuration of multiple candidate cells for L1 or L2 inter-cell mobility; receiving, from the network entity, information about an L2 reset when switching between the multiple candidate cells; performing, in response to L1 or L2 signaling, a serving cell switch within the candidate cells for the UE; and resetting or reusing an L2 cell configuration, in response to the serving cell switch, and based on the information.

Aspect 2 is the method of aspect 1, where the information includes a grouping of the multiple candidate cells and includes one or more cell groups of the multiple candidate cells according to one or more of: first associations of each of the multiple candidate cells with one or more DUs of the network entity; second associations of each of the multiple candidate cells with one or more CUs of the network entity; and third associations of each of the multiple candidate cells with one or more TRPs of the network entity.

Aspect 3 is the method of aspect 2, where performing the serving cell switch within the candidate cells for the UE includes: changing one or more serving cells connected to the UE from one or more source cells to one or more target cells, the one or more source cells and the one or more target cells within the multiple candidate cells. Resetting or reusing the L2 cell configuration includes: resetting the L2 cell configuration of the UE in response to the one or more target cells and the one or more source cells in different cell groups of the one or more cell groups; or reusing the L2 cell configuration for the source cell for the UE in response to the one or more target cells and the one or more source cells in a same cell group of the one or more cell groups.

Aspect 4 is the method of any of aspects 1 to 3, where resetting the L2 cell configuration of the UE includes one or more of: a MAC layer reset or reestablishment; an RLC layer reset or reestablishment; and a PDCP layer recovery.

Aspect 5 is the method of any of aspects 3 to 4, where changing the one or more serving cells connected to the UE further includes: performing, based on a grouping of the one or more target cells and the one or more source cells in the grouping of the multiple candidate cells, a partial L2 layer reset.

Aspect 6 is the method of any of aspects 3 to 4, where changing the one or more serving cells connected to the UE further includes: performing, based on a grouping of the one or more target cells and the one or more source cells in the grouping of the multiple candidate cells, a RACH procedure.

Aspect 7 is the method of any of aspects 3 to 4, where changing the one or more serving cells connected to the UE further includes: selecting, based on a grouping of the one or more target cells and the one or more source cells in the grouping of the multiple candidate cells, a measurement configuration for the UE.

Aspect 8 is the method of any of aspects 3 to 7, where the method further includes: receiving, from the network entity, via a MAC-CE or DCI, one or more cell IDs or indications of cell IDs, where the one or more cell IDs or indications of cell IDs respectively identify the one or more target cells in the multiple candidate cells.

Aspect 9 is the method of any of aspects 1 to 8, where the information includes an indication in a MAC-CE or DCI that indicates whether to reset an L2 cell configuration in response to the serving cell switch.

Aspect 10 is the method of any of aspects 1 to 8, where the information is included in an indication from a target cell. The indication indicates whether to reset an L2 cell configuration for the target cell in response to the serving cell switch.

Aspect 11 is the method of any of aspects 1 to 8, where the information is based on a presence or an absence of an indication from a target cell. The presence or the absence of the indication indicates whether to reset an L2 cell configuration for the target cell in response to the serving cell switch.

Aspect 12 is the method of aspect 11, where resetting or reusing the L2 cell configuration includes: reusing the L2 cell configuration after the serving cell switch based on the absence of the indication; or resetting the L2 cell configuration after the serving cell switch based on the presence of the indication.

Aspect 13 is an apparatus for wireless communication at a UE, including: at least one memory; and at least one processor coupled to the at least one memory and, based at least in part on information stored in the at least one memory, the at least one processor, individually or in any combination, is configured to cause the UE perform the method of any of aspects 1-12.

Aspect 14 is the apparatus for wireless communication at a UE, comprising means for performing each step in the method of any of aspect 1-12.

Aspect 15 is an apparatus of any of aspects 13-14, further comprising a transceiver configured to receive or to transmit in association with the method of any of aspects 1-12.

Aspect 16 is a computer-readable medium (e.g., a nontransitory computer-readable medium) storing computer executable code at a UE, where the code when executed by at least one processor causes the UE to perform the method of any of aspects 1-12. Aspect 17 is a method of wireless communication at a network entity. The method includes transmitting, to a UE, via RRC, a configuration of multiple candidate cells for L1 or L2 inter-cell mobility; transmitting, to the UE, information about an L2 reset when switching between the multiple candidate cells to cause the UE to perform a cell switch between multiple candidate cells. The cell switch includes: performing, in response to L1 or L2 signaling, a serving cell switch within the candidate cells for the UE, and resetting or reusing an L2 cell configuration based on the information in response to the serving cell switch.

Aspect 18 is the method of aspect 17, where the information includes a grouping of the multiple candidate cells and includes one or more cell groups of the multiple candidate cells according to one or more of: first associations of each of the multiple candidate cells with one or more DUs of the network entity; second associations of each of the multiple candidate cells with one or more CUs of the network entity; and third associations of each of the multiple candidate cells with one or more TRPs of the network entity.

Aspect 19 is the method of aspect 18, wherein performing the serving cell switch within the candidate cells for the UE includes: changing one or more serving cells connected to the UE from one or more source cells to one or more target cells, the one or more source cells and the one or more target cells within the multiple candidate cells. Resetting or reusing the L2 cell configuration includes: resetting the L2 cell configuration of the UE in response to the one or more target cells and the one or more source cells in different cell groups of the one or more cell groups; or reusing the L2 cell configuration for the source cell for the UE in response to the one or more target cells and the one or more source cells in a same cell group of the one or more cell groups.

Aspect 20 is the method of any of aspects 17 to 19, where resetting the L2 cell configuration of the UE includes one or more of: a MAC layer reset or reestablishment; an RLC layer reset or reestablishment; or a PDCP layer recovery.

Aspect 21 is the method of any of aspects 19 to 20, where the information indicates for the UE, when changing the one or more serving cells connected to the UE, to perform, based on a grouping of the one or more target cells and the one or more source cells in the grouping of the multiple candidate cells, a partial L2 layer reset.

Aspect 22 is the method of any of aspects 19 to 20, where the information indicates for the UE, when changing the one or more serving cells connected to the UE, to perform, based on a grouping of the one or more target cells and the one or more source cells in the grouping of the multiple candidate cells, a RACH procedure.

Aspect 23 is the method of any of aspects 19 to 20, where the information indicates for the UE, when changing the one or more serving cells connected to the UE, to select, based on a grouping of the one or more target cells and the one or more source cells in the grouping of the multiple candidate cells, a measurement configuration for the UE.

Aspect 24 is the method of any of aspects 19 to 23, where the method further includes: transmitting, to the UE, via a MAC-CE or DCI, one or more cell IDs or indications of cell IDs, where the one or more cell IDs or indications of cell IDs respectively identify the one or more target cells in the multiple candidate cells.

Aspect 25 is the method of any of aspects 17 to 24, where the information includes an indication in a MAC-CE or DCI that indicates whether to reset an L2 cell configuration in response to the serving cell switch.

Aspect 26 is the method of any of aspects 17 to 24, where the information is included in an indication from a target cell. The indication indicates whether to reset an L2 cell configuration for the target cell in response to the serving cell switch.

Aspect 27 is the method of any of aspects 17 to 24, where the information is based on a presence or an absence of an indication from a target cell. The presence or the absence of the indication indicates whether to reset an L2 cell configuration for the target cell in response to the serving cell switch.

Aspect 28 is the method of aspect 27, where resetting or reusing the L2 cell configuration includes: reusing the L2 cell configuration after the serving cell switch based on the absence of the indication; or resetting the L2 cell configuration after the serving cell switch based on the presence of the indication.

Aspect 29 is an apparatus for wireless communication at a network entity, including: at least one memory; and at least one processor coupled to the at least one memory and, based at least in part on information stored in the at least one memory, the at least one processor, individually or in any combination, is configured to cause the network entity to perform the method of any of aspects 17-28.

Aspect 30 is the apparatus for wireless communication at a network entity, comprising means for performing each step in the method of any of aspects 17-28.

Aspect 31 is an apparatus of any of aspects 29-30, further comprising a transceiver configured to receive or to transmit in association with the method of any of aspects 17-28.

Aspect 32 is a computer-readable medium (e.g., a non-transitory computer-readable medium) storing computer executable code at a network entity, where the code when executed by at least one processor causes the network entity to perform the method of any of aspects 17-28.

What is claimed is:

1. An apparatus for wireless communication at a user equipment (UE), comprising:
   at least one memory; and
   at least one processor coupled to the at least one memory and, based at least in part on stored information that is stored in the at least one memory, the at least one processor is configured to:
   receive, from a network entity, via radio resource control (RRC), a configuration of multiple candidate cells for layer 1 (L1) or layer 2 (L2) inter-cell mobility and a grouping of the multiple candidate cells and comprises one or more cell groups of the multiple candidate cells;
   receive, from the network entity, information about an L2 reset when switching between the multiple candidate cells;
   perform, in response to L1 or L2 signaling, a serving cell switch within the multiple candidate cells for the UE;
   reset or reuse an L2 cell configuration, in response to the serving cell switch and based on the information; and
   select, based on the grouping of one or more target cells and one or more source cells in the grouping of the multiple candidate cells, a measurement configuration for the UE.

2. The apparatus of claim 1, wherein the information about the L2 reset when switching between the multiple candidate cells in response to the L1 or L2 signaling is comprised in an RRC configuration.

3. The apparatus of claim 2, wherein the RRC configuration indicates whether the L2 reset is to be performed depending on a source cell and a target cell for the serving cell switch.

4. The apparatus of claim 1, further comprising a transceiver coupled to the at least one processor, wherein, to receive the information about the L2 reset, the at least one processor is configured to receive the information about the L2 reset via the transceiver.

5. The apparatus of claim 1, wherein the grouping of the multiple candidate cells comprises one or more cell groups of the multiple candidate cells according to one or more of:

first associations of each of the multiple candidate cells with one or more distributed units (DUs) of the network entity;

second associations of each of the multiple candidate cells with one or more centralized units (CUs) of the network entity; and third associations of each of the multiple candidate cells with one or more transmit reception points (TRPs) of the network entity.

6. The apparatus of claim 5, wherein, to perform the serving cell switch within the multiple candidate cells for the UE, the at least one processor is configured to:

change one or more serving cells connected to the UE from the one or more source cells to the one or more target cells, wherein the one or more source cells and the one or more target cells are within the multiple candidate cells, and wherein, to reset or reuse the L2 cell configuration, the at least one processor is configured to:

reset the L2 cell configuration of the UE in response to the one or more target cells and the one or more source cells in different cell groups of the one or more cell groups; or reuse the L2 cell configuration for a source cell for the UE in response to the one or more target cells and the one or more source cells in a same cell group of the one or more cell groups.

7. The apparatus of claim 6, wherein, to reset the L2 cell configuration of the UE, the at least one processor is configured to perform one or more of:

a medium access control (MAC) layer reset or reestablishment;

a radio link control (RLC) layer reset or reestablishment; or a packet data convergence protocol (PDCP) layer recovery.

8. The apparatus of claim 6, wherein, to change the one or more serving cells connected to the UE, the at least one processor is further configured to:

perform, based on the grouping of the one or more target cells and the one or more source cells in the grouping of the multiple candidate cells, a partial L2 layer reset.

9. The apparatus of claim 6, wherein, to change the one or more serving cells connected to the UE, the at least one processor is further configured to:

perform, based on the grouping of the one or more target cells and the one or more source cells in the grouping of the multiple candidate cells, a random-access channel (RACH) procedure.

10. The apparatus of claim 6, wherein the at least one processor is further configured to:

receive, from the network entity, via a medium access control-control element (MAC-CE) or downlink control information (DCI), one or more cell IDs or indications of cell IDs, wherein the one or more cell IDs or the indications of the cell IDs respectively identify the one or more target cells in the multiple candidate cells.

11. The apparatus of claim 1, wherein the information is included in an indication in a medium access control-control element (MAC-CE) or downlink control information (DCI) that indicates whether to reset the L2 cell configuration in response to the serving cell switch.

12. The apparatus of claim 1, wherein the information is comprised in an indication from a target cell, the indication indicating whether to reset the L2 cell configuration for the target cell in response to the serving cell switch.

13. The apparatus of claim 1, wherein the information is based on a presence or an absence of an indication from a target cell, the presence or the absence of the indication indicating whether to reset the L2 cell configuration for the target cell in response to the serving cell switch, wherein, to reset or reuse the L2 cell configuration, the at least one processor is configured to:

reuse the L2 cell configuration after the serving cell switch based on the absence of the indication; or reset the L2 cell configuration after the serving cell switch based on the presence of the indication.

14. An apparatus for wireless communication at a network entity, comprising:

at least one memory; and at least one processor coupled to the at least one memory and, based at least in part on stored information that is stored in the at least one memory, the at least one processor is configured to:

transmit, to a user equipment (UE), via radio resource control (RRC), a configuration of multiple candidate cells for layer 1 (L1) or layer 2 (L2) inter-cell mobility and a grouping of the multiple candidate cells and comprises one or more cell groups of the multiple candidate cells; and 2 transmit, to the UE, information about an L2 reset when switching between the multiple candidate cells to cause the UE to perform a cell switch between the multiple candidate cells, comprising:

a serving cell switch within the multiple candidate cells for the UE in response to L1 or L2 signaling, a reset or a reuse of an L2 cell configuration, in response to the serving cell switch, and based on the information, and select, based on the grouping of one or more target cells and one or more source cells in the grouping of the multiple candidate cells, a measurement configuration for the UE.

15. The apparatus of claim 14, wherein the information about the L2 reset when switching between the multiple candidate cells in response to the L1 or L2 signaling is comprised in an RRC configuration.

16. The apparatus of claim 15, wherein the RRC configuration indicates whether the L2 reset is to be performed depending on a source cell and a target cell for the serving cell switch.

17. The apparatus of claim 14, further comprising a transceiver coupled to the at least one processor, wherein, to transmit the information about the L2 reset, the at least one processor is configured to transmit the information about the L2 reset via the transceiver.

18. The apparatus of claim 14, wherein the information includes a grouping of the multiple candidate cells and comprises one or more cell groups of the multiple candidate cells according to one or more of:

first associations of each of the multiple candidate cells with one or more distributed units (DUs) of the network entity;

second associations of each of the multiple candidate cells with one or more centralized units (CUs) of the network entity; and third associations of each of the multiple candidate cells with one or more transmit reception points (TRPs) of the network entity.

19. The apparatus of claim 18, wherein the serving cell switch within the multiple candidate cells for the UE comprises:

a change of one or more serving cells connected to the UE from one or more source cells to one or more target cells, the one or more source cells and the one or more target cells within the multiple candidate cells, and wherein the information indicates for the UE to:

reset of the L2 cell configuration of the UE in response to the one or more target cells and the one or more source cells in different cell groups of the one or more cell groups; or reuse of the L2 cell configuration for a source cell for the UE in response to the one or more target cells and the one or more source cells in a same cell group of the one or more cell groups.

20. The apparatus of claim 19, wherein the reset of the L2 cell configuration of the UE comprises one or more of:

a medium access control (MAC) layer reset or reestablishment;

a radio link control (RLC) layer reset or reestablishment; or a packet data convergence protocol (PDCP) layer recovery.

21. The apparatus of claim 19, wherein the at least one processor is further configured to:

transmit, to the UE, via a medium access control-control element (MAC-CE) or downlink control information (DCI), one or more cell IDs or indications of cell IDs, wherein the one or more cell IDs or the indications of the cell IDs respectively identify the one or more target cells in the multiple candidate cells.

22. The apparatus of claim 14, wherein the information is included in an indication in a medium access control-control element (MAC-CE) or downlink control information (DCI) that indicates whether to reset the L2 cell configuration in response to the serving cell switch.

23. The apparatus of claim 14, wherein the information is comprised in an indication from a target cell, the indication indicating whether to reset the L2 cell configuration for the target cell in response to the serving cell switch.

24. The apparatus of claim 14, wherein the information is based on a presence or an absence of an indication from a target cell, the presence or the absence of the indication indicating whether to reset the L2 cell configuration for the target cell in response to the serving cell switch.

25. The apparatus of claim 24, wherein resetting or reusing the L2 cell configuration includes:

reusing the L2 cell configuration after the serving cell switch based on the absence of the indication; or resetting the L2 cell configuration after the serving cell switch based on the presence of the indication.

26. A method of wireless communication at a user equipment (UE), comprising:

receiving, from a network entity, via radio resource control (RRC), a configuration of multiple candidate cells for layer 1 (L1) or layer 2 (L2) inter-cell mobility;

receiving, from the network entity, information about an L2 reset when switching between the multiple candidate cells, wherein the information includes a grouping of the multiple candidate cells and comprises one or more cell groups of the multiple candidate cells;

performing, in response to L1 or L2 signaling, a serving cell switch within the multiple candidate cells for the UE;

resetting or reusing an L2 cell configuration, in response to the serving cell switch, and based on the information; and selecting, based on the grouping of one or more target cells and one or more source cells in the grouping of the multiple candidate cells, a measurement configuration for the UE.

27. The method of claim 26, wherein the grouping of the multiple candidate cells comprises one or more cell groups of the multiple candidate cells according to one or more of:

first associations of each of the multiple candidate cells with one or more distributed units (DUs) of the network entity;

second associations of each of the multiple candidate cells with one or more centralized units (CUs) of the network entity; and third associations of each of the multiple candidate cells with one or more transmit reception points (TRPs) of the network entity.

28. A method of wireless communication at a network entity, comprising:

transmitting, to a user equipment (UE), via radio resource control (RRC), a configuration of multiple candidate cells for layer 1 (L1) or layer 2 (L2) inter-cell mobility; and transmitting, to the UE, information about an L2 reset when switching between the multiple candidate cells to cause the UE to perform a cell switch between the multiple candidate cells, comprising: p2 performing, in response to L1 or L2 signaling, a serving cell switch within the multiple candidate cells for the UE, resetting or reusing an L2 cell configuration, in response to the serving cell switch, and based on the information, and selecting, based on the grouping of one or more target cells and one or more source cells in the grouping of the multiple candidate cells, a measurement configuration for the UE.

29. The method of claim 28, wherein the grouping of the multiple candidate cells comprises one or more cell groups of the multiple candidate cells according to one or more of:

first associations of each of the multiple candidate cells with one or more distributed units (DUs) of the network entity;

second associations of each of the multiple candidate cells with one or more centralized units (CUs) of the network entity; and third associations of each of the multiple candidate cells with one or more transmit reception points (TRPs) of the network entity.

* * * * *